United States Patent
Figiel

(10) Patent No.: US 9,804,044 B2
(45) Date of Patent: Oct. 31, 2017

(54) METHOD AND SYSTEM ASSOCIATED WITH A SENSING ROLL AND A MATING ROLL FOR COLLECTING DATA INCLUDING FIRST AND SECOND SENSOR ARRAYS

(71) Applicant: INTERNATIONAL PAPER COMPANY, Memphis, TN (US)

(72) Inventor: Kerry D. Figiel, Cincinnati, OH (US)

(73) Assignee: INTERNATIONAL PAPER COMPANY, Memphis, TN (US)

( * ) Notice: Subject to any disclaimer, the term of this patent is extended or adjusted under 35 U.S.C. 154(b) by 688 days.

(21) Appl. No.: 14/268,706

(22) Filed: May 2, 2014

(65) Prior Publication Data
US 2015/0316429 A1 Nov. 5, 2015

(51) Int. Cl.
*G01L 5/00* (2006.01)
*D21F 3/08* (2006.01)

(52) U.S. Cl.
CPC .............. *G01L 5/0028* (2013.01); *D21F 3/08* (2013.01); *G01L 5/0085* (2013.01)

(58) Field of Classification Search
None
See application file for complete search history.

(56) References Cited

U.S. PATENT DOCUMENTS

| | | |
|---|---|---|
| 757,221 A | 4/1904 | Partridge |
| 2,300,909 A | 11/1942 | Broughton |
| 3,622,448 A | 11/1971 | Adams et al. |
| 3,673,865 A | 7/1972 | Michaelsen |
| 3,794,427 A | 2/1974 | Shibata et al. |
| 3,840,302 A | 10/1974 | Brunton et al. |
| 3,863,453 A | 2/1975 | Mercier |

(Continued)

FOREIGN PATENT DOCUMENTS

| | | |
|---|---|---|
| CN | 1782223 A | 6/2006 |
| CN | 1989294 A | 6/2007 |

(Continued)

OTHER PUBLICATIONS

Sasaki et al., In-Roll Stress Analysis Considering Air-Entrainment at the Roll-Inlet with the Effect of Grooves on Nip Roll Surface, 2008, pp. 133-145, vol. 2, No. 1, Journal of Advanced Mechanical Design, Systems, and Manufacturing.

*Primary Examiner* — Mohamed Charioui
(74) *Attorney, Agent, or Firm* — Thomas W. Barnes, III

(57) ABSTRACT

Collecting roll data associated with a sensing roll and a mating roll forming a nip includes generating sensor signals from a first sensor array on the sensing roll and a second sensor array on the mating roll during rotations of the mating rolls and sensing rolls. A periodically occurring first time reference is associated with each rotation of the mating roll and a periodically occurring second time reference is associated with each rotation of the sensing roll. For a received sensor signal, based on whether the received signal is from the sensors of the mating roll or the sensing roll, a tracking segment on the other roll is detected that enters a region of the nip concurrent with the sensor that generated the received signal. The detection is made from either a most-recent-identified first time reference or second time reference. The received signal can then be stored using the detected tracking segment.

35 Claims, 15 Drawing Sheets

(56) References Cited

U.S. PATENT DOCUMENTS

| | | | |
|---|---|---|---|
| 3,936,665 A | 2/1976 | Donoghue | |
| 3,989,085 A | 11/1976 | Crosby | |
| 4,019,066 A | 4/1977 | Lucas et al. | |
| 4,059,794 A | 11/1977 | Furness et al. | |
| 4,092,068 A | 5/1978 | Lucas et al. | |
| 4,152,202 A | 5/1979 | DeLigt | |
| 4,233,011 A | 11/1980 | Bolender et al. | |
| 4,423,636 A | 1/1984 | Plante | |
| 4,495,587 A | 1/1985 | Plante et al. | |
| 4,509,237 A | 4/1985 | Volz et al. | |
| 4,524,546 A | 6/1985 | Hoover et al. | |
| 4,729,153 A | 3/1988 | Pav et al. | |
| 4,879,471 A | 11/1989 | Dahlquist | |
| 4,898,012 A | 2/1990 | Jones et al. | |
| 4,903,528 A | 2/1990 | Balakrishnan et al. | |
| 4,921,574 A | 5/1990 | Hu | |
| 4,947,684 A | 8/1990 | Balakrishnan | |
| 5,022,966 A | 6/1991 | Hu | |
| 5,048,353 A | 9/1991 | Justus | |
| 5,121,332 A | 6/1992 | Balakrishnan et al. | |
| 5,122,963 A | 6/1992 | Chen | |
| 5,125,746 A | 6/1992 | Lipshitz | |
| 5,358,606 A | 10/1994 | Makkonen | |
| 5,379,652 A | 1/1995 | Allonen | |
| 5,383,371 A | 1/1995 | Laitinen | |
| 5,400,258 A | 3/1995 | He | |
| 5,562,027 A * | 10/1996 | Moore | D21F 3/06 100/176 |
| 5,563,809 A | 10/1996 | Williams et al. | |
| 5,592,875 A * | 1/1997 | Moschel | B30B 3/04 100/153 |
| 5,699,729 A | 12/1997 | Moschel | |
| 5,725,737 A | 3/1998 | Pikulik et al. | |
| 5,743,177 A | 4/1998 | Wostbrock | |
| 5,745,365 A | 4/1998 | Parker | |
| 5,960,374 A | 9/1999 | Lausier | |
| 6,152,720 A | 11/2000 | Greb et al. | |
| 6,336,078 B1 | 1/2002 | Sakayori et al. | |
| 6,356,846 B1 | 3/2002 | Habeger, Jr. et al. | |
| 6,370,961 B1 * | 4/2002 | Trantzas | G01L 5/0085 73/824 |
| 6,411,860 B1 | 6/2002 | Chen | |
| 6,482,339 B1 | 11/2002 | Greb et al. | |
| 6,519,552 B1 | 2/2003 | Sampath et al. | |
| 6,567,720 B1 | 5/2003 | Figiel | |
| 6,568,285 B1 | 5/2003 | Moore et al. | |
| 6,769,314 B2 | 8/2004 | Moore | |
| 6,805,899 B2 | 10/2004 | MacHattie et al. | |
| 6,849,851 B2 | 2/2005 | Komulainen et al. | |
| 6,925,279 B2 | 8/2005 | Kamoshita | |
| 6,934,028 B2 | 8/2005 | Ho et al. | |
| 6,950,777 B1 | 9/2005 | Lilburn et al. | |
| 7,018,708 B2 | 3/2006 | Song et al. | |
| 7,127,315 B2 | 10/2006 | Junge et al. | |
| 7,155,356 B2 | 12/2006 | Mantyla et al. | |
| 7,185,537 B2 | 3/2007 | Muhs | |
| 7,225,688 B2 | 6/2007 | Moore et al. | |
| 7,261,680 B2 | 8/2007 | Lutz | |
| 7,294,234 B2 | 11/2007 | Munch et al. | |
| 7,305,894 B2 | 12/2007 | Moore et al. | |
| 7,392,715 B2 | 7/2008 | Moore et al. | |
| 7,406,876 B2 | 8/2008 | Krozer | |
| 7,444,862 B2 | 11/2008 | Innala et al. | |
| 7,581,456 B2 | 9/2009 | Moore et al. | |
| 7,582,188 B2 | 9/2009 | Stoffel et al. | |
| 7,608,166 B2 | 10/2009 | Huang et al. | |
| 7,608,338 B2 | 10/2009 | Song et al. | |
| 7,629,799 B2 | 12/2009 | Murphy | |
| 7,736,466 B2 | 6/2010 | Singh et al. | |
| 7,745,525 B2 | 6/2010 | Koenig | |
| 7,815,770 B2 | 10/2010 | Huang et al. | |
| 7,828,935 B2 | 11/2010 | Huang et al. | |
| 7,963,180 B2 | 6/2011 | Moore et al. | |
| 7,967,953 B2 | 6/2011 | Singh et al. | |
| 8,007,920 B2 | 8/2011 | Song et al. | |
| 8,012,551 B2 | 9/2011 | Song et al. | |
| 8,123,907 B2 | 2/2012 | Stoffel et al. | |
| 8,236,141 B2 | 8/2012 | Pak | |
| 8,292,295 B2 | 10/2012 | Ohshima et al. | |
| 8,361,573 B2 | 1/2013 | Koenig | |
| 8,372,243 B2 | 2/2013 | Singh et al. | |
| 8,382,946 B2 | 2/2013 | Song et al. | |
| 8,440,053 B2 | 5/2013 | Koenig et al. | |
| 8,474,333 B2 | 7/2013 | Berendes | |
| 8,475,347 B2 | 7/2013 | Gustafsom et al. | |
| 8,486,229 B2 | 7/2013 | Pietikainen et al. | |
| 8,540,241 B2 | 9/2013 | Sugahara | |
| 8,574,690 B2 | 11/2013 | Koenig et al. | |
| 8,586,156 B2 | 11/2013 | Koenig et al. | |
| 8,586,279 B2 | 11/2013 | Williams et al. | |
| 8,586,280 B2 | 11/2013 | Williams et al. | |
| 8,608,908 B2 | 12/2013 | Koenig et al. | |
| 8,652,593 B2 | 2/2014 | Koenig | |
| 8,652,594 B2 | 2/2014 | Koenig et al. | |
| 8,697,203 B2 | 4/2014 | Koenig | |
| 8,758,565 B2 | 6/2014 | Singh et al. | |
| 8,758,886 B2 | 6/2014 | Koenig et al. | |
| 8,795,796 B2 | 8/2014 | Koenig | |
| 9,121,686 B2 | 9/2015 | Gustafson | |
| 2004/0237665 A1 | 12/2004 | Mucke et al. | |
| 2005/0208878 A1 | 9/2005 | Weiss | |
| 2006/0248723 A1 | 11/2006 | Gustafson | |
| 2007/0006644 A1 | 1/2007 | Schultheis | |
| 2008/0087073 A1 | 4/2008 | Ulfert et al. | |
| 2010/0125428 A1 | 5/2010 | Moore | |
| 2012/0310596 A1 | 12/2012 | Gustafson et al. | |
| 2013/0185015 A1 | 7/2013 | Cantrell | |
| 2014/0257719 A1 | 9/2014 | Figiel | |
| 2014/0352882 A1 | 12/2014 | Nash et al. | |
| 2015/0316429 A1 | 11/2015 | Figiel | |
| 2015/0316430 A1 | 11/2015 | Figiel | |
| 2015/0316432 A1 | 11/2015 | Figiel | |
| 2016/0038969 A1 | 2/2016 | Schmitt | |

FOREIGN PATENT DOCUMENTS

| | | |
|---|---|---|
| CN | 101395456 A | 3/2009 |
| CN | 102345242 A | 2/2012 |
| EP | 1653207 | 5/2006 |
| EP | 2641857 | 12/2015 |
| WO | 9625288 | 8/1996 |
| WO | 2005113891 | 12/2005 |
| WO | WO-2008/155461 | 12/2008 |
| WO | WO-2009/092761 | 7/2009 |
| WO | 2011107660 | 9/2011 |
| WO | WO-2012/166835 A1 | 12/2012 |

\* cited by examiner

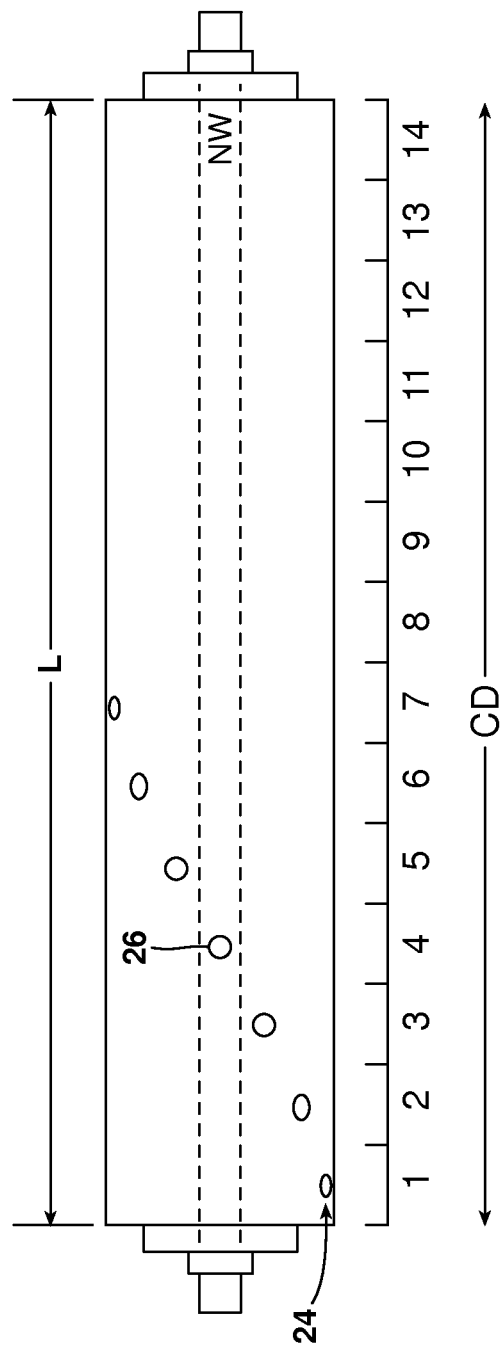

FIG. 4A

| 1000<br>Revolution # | 1002<br>Segment # in nip | | 1004<br>Segment # | 1006<br>Number of Times<br>Segment Sensed in<br>500 Rotations |
|---|---|---|---|---|
| 1 | 3 | | 1 | 10 |
| 2 | 5 | | 2 | 10 |
| 3 | 7 | | 3 | 10 |
| 4 | 9 | | 4 | 10 |
| 5 | 11 | | 5 | 10 |
| 6 | 13 | | 6 | 10 |
| 7 | 15 | | 7 | 11 |
| 8 | 18 | | 8 | 11 |
| 9 | 20 | | 9 | 10 |
| 10 | 22 | | 10 | 10 |
| 11 | 24 | | 11 | 10 |
| 12 | 26 | | 12 | 10 |
| 13 | 28 | | 13 | 10 |
| 14 | 30 ←1003 | | 14 | 11 |
| | | | 15 | 11 |
| | | | 16 | 10 |
| | | | 17 | 10 |
| | | | 18 | 10 |
| | | | 19 | 10 |
| | | | 20 | 10 |
| | | | 21 | 11 |
| | | | 22 | 11 |
| | | | 23 | 9 |
| | | | 24 | 10 |
| | | | 25 | 9 |
| | | | 26 | 10 |
| | | | 27 | 9 |
| | | | 28 | 11 ←1005 |

| 1000 Revolution # | 1002 Segment # in nip | 1004 Segment # | 1006 Number of Times Segment Sensed in 500 Rotations |
|---|---|---|---|
| 15 | 33 | | |
| 16 | 35 | | |
| 17 | 37 | | |
| 18 | 39 | | |
| 19 | 41 | | |
| 20 | 43 | | |
| 21 | 45 | | |
| 22 | 48 | | |
| 23 | 50 | | |
| 24 | 2 | | |
| 25 | 4 | | |
| 26 | 6 | | |
| 27 | 8 | | |
| 28 | 10 | | |
| 29 | 13 | 29 | 10 |
| 30 | 15 | 30 | 10 |
| 31 | 17 | 31 | 9 |
| 32 | 19 | 32 | 10 |
| 33 | 21 | 33 | 9 |
| 34 | 23 | 34 | 10 |
| 35 | 25 | 35 | 10 |
| 36 | 28 | 36 | 11 |
| 37 | 30 | 37 | 10 |
| 38 | 32 | 38 | 9 |
| 39 | 34 | 39 | 10 |
| 40 | 36 | 40 | 9 |
| 41 | 38 | 41 | 10 |
| 42 | 40 | 42 | 9 |
| 43 | 43 | 43 | 12 |
| 44 | 45 | 44 | 9 |
| 45 | 47 | 45 | 10 |
| 46 | 49 | 46 | 9 |
| 47 | 1 | 47 | 10 |
| 48 | 3 | 48 | 9 |
| 49 | 5 | 49 | 10 |
| 50 | 8 | 50 | 11 |

FIG. 6

| CIRCUMFERENTIAL SEGMENT | AXIAL SENSOR NUMBER | | | | | |
|---|---|---|---|---|---|---|
| | 1 | 2 | 3 | 4 | ... | 14 |
| 1 | | | | | | |
| 2 | | | | | | |
| 3 | | | | | | |
| 4 | | | | | | |
| ... | | | | | | |
| 50 | | | | | | |

COUNTS MATRIX 100

FIG. 7

| CIRCUMFERENTIAL SEGMENT | AXIAL SENSOR NUMBER | | | | | | |
|---|---|---|---|---|---|---|---|
| | 1 | 2 | 3 | 4 | ... | 14 | |
| 1 | | | | | | | ← 200 |
| 2 | | | | | | | |
| 3 | | | | | | | |
| 4 | | | | | | | |
| ... | | | | | | | |
| 50 | | | | | | | |

SUM OF PRESSURE READINGS MATRIX

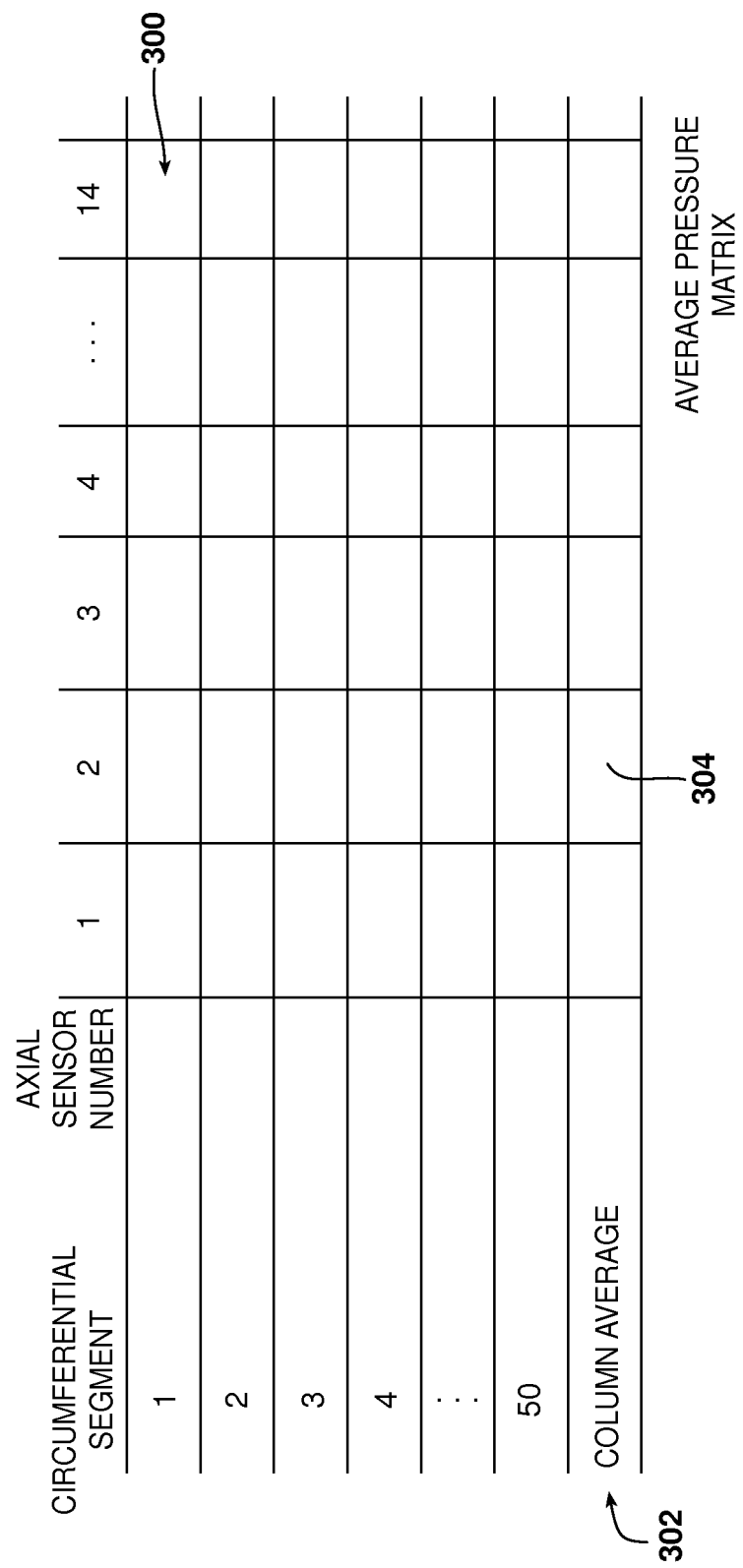

FIG. 8B

| CIRCUMFERENTIAL SEGMENT | AXIAL SENSOR NUMBER | | | | | |
|---|---|---|---|---|---|---|
| | 1 | 2 | 3 | 4 | ... | 14 |
| 1 | | | | | | |
| 2 | | | | | | |
| 3 | | | | | | |
| 4 | | | | | | |
| ... | | | | | | |
| 50 | | | | | | |

CORRECTION MATRIX ← 310

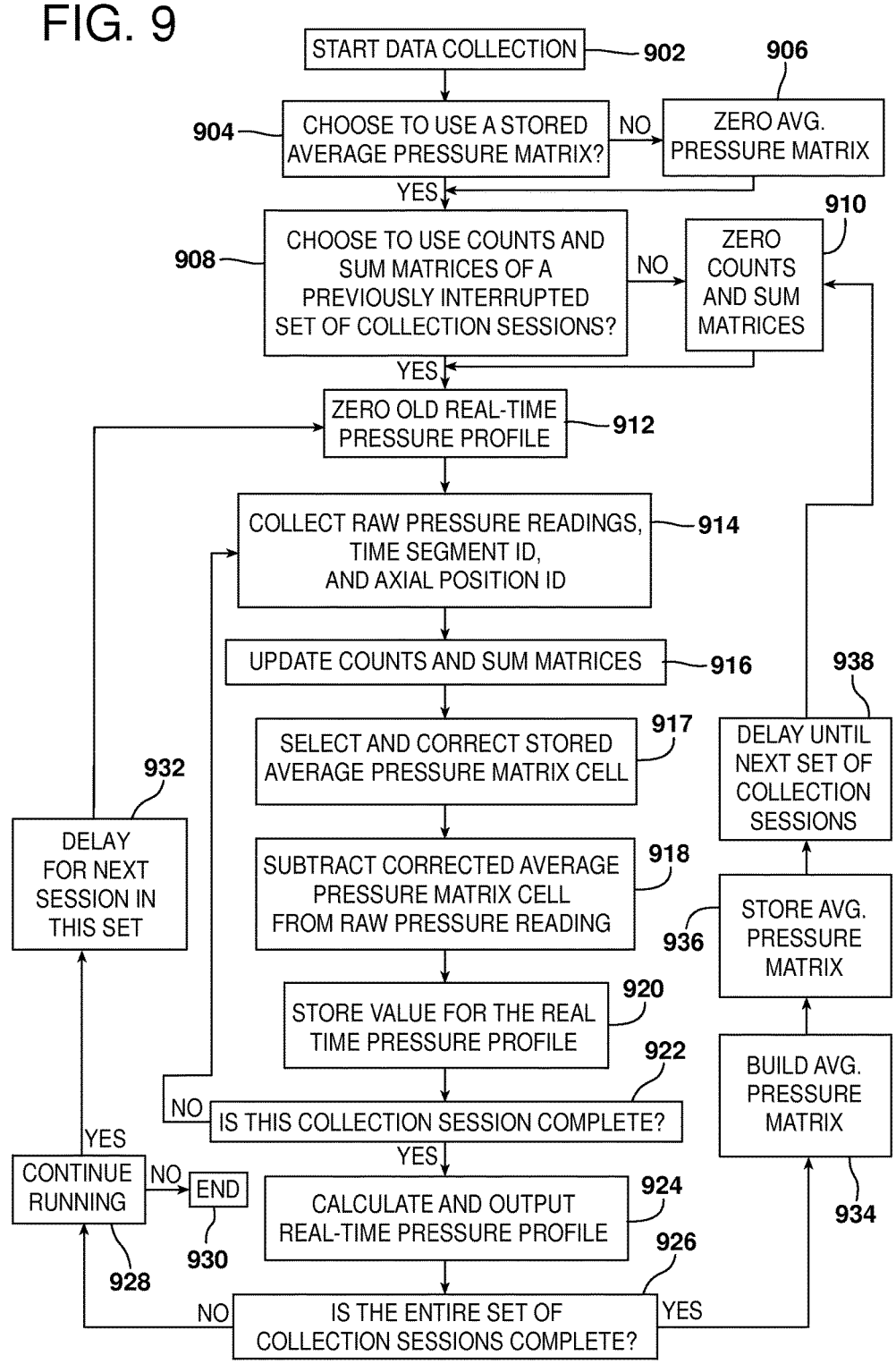

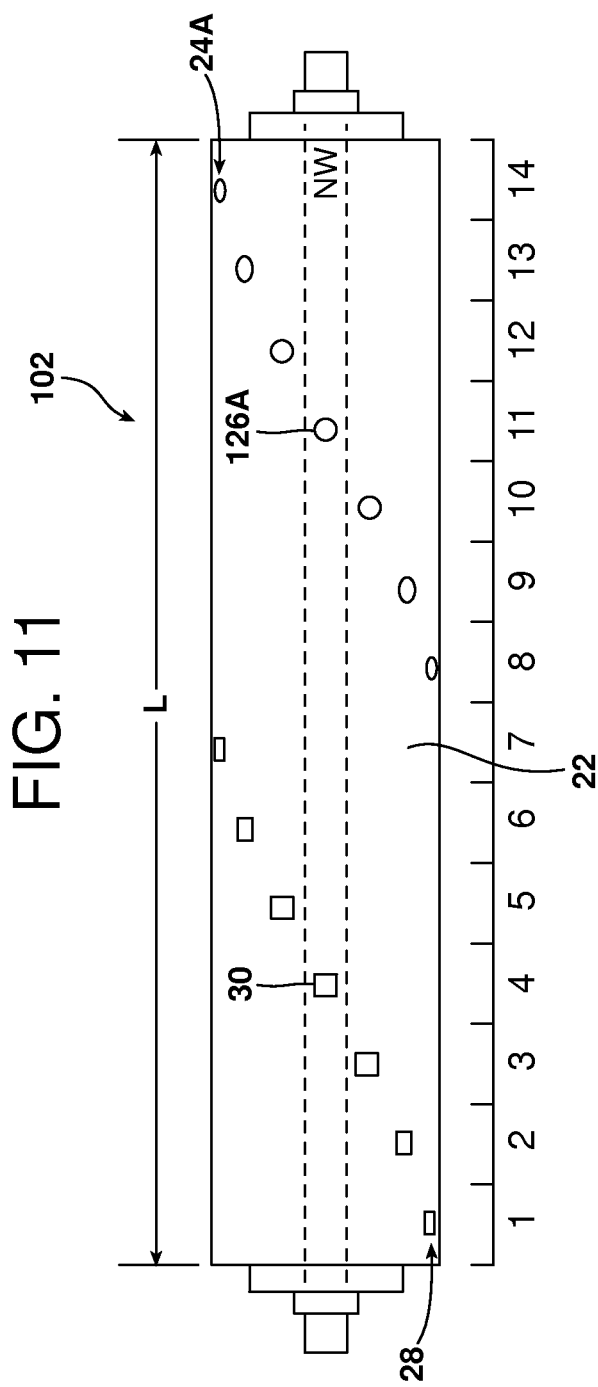

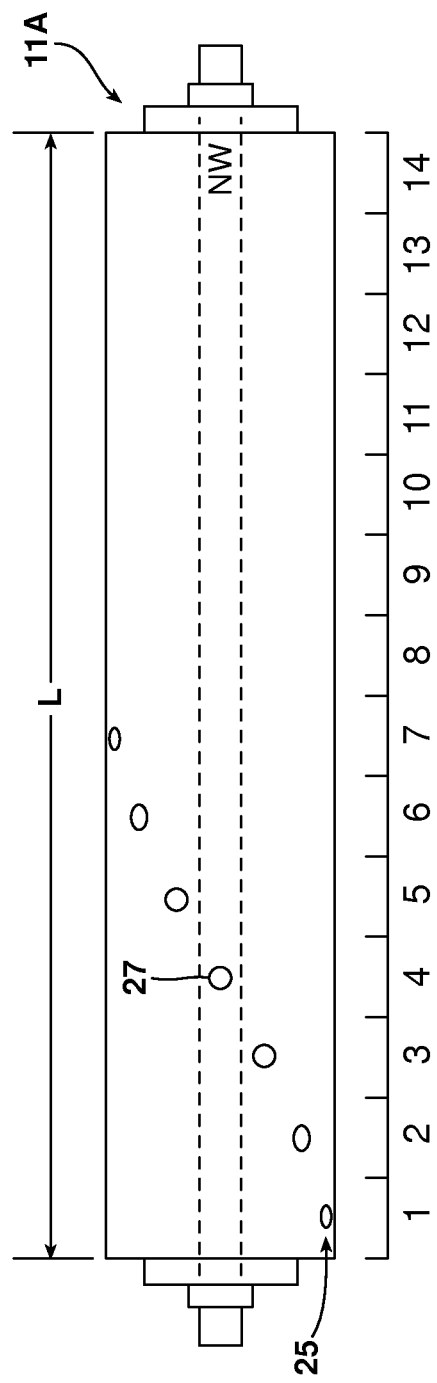

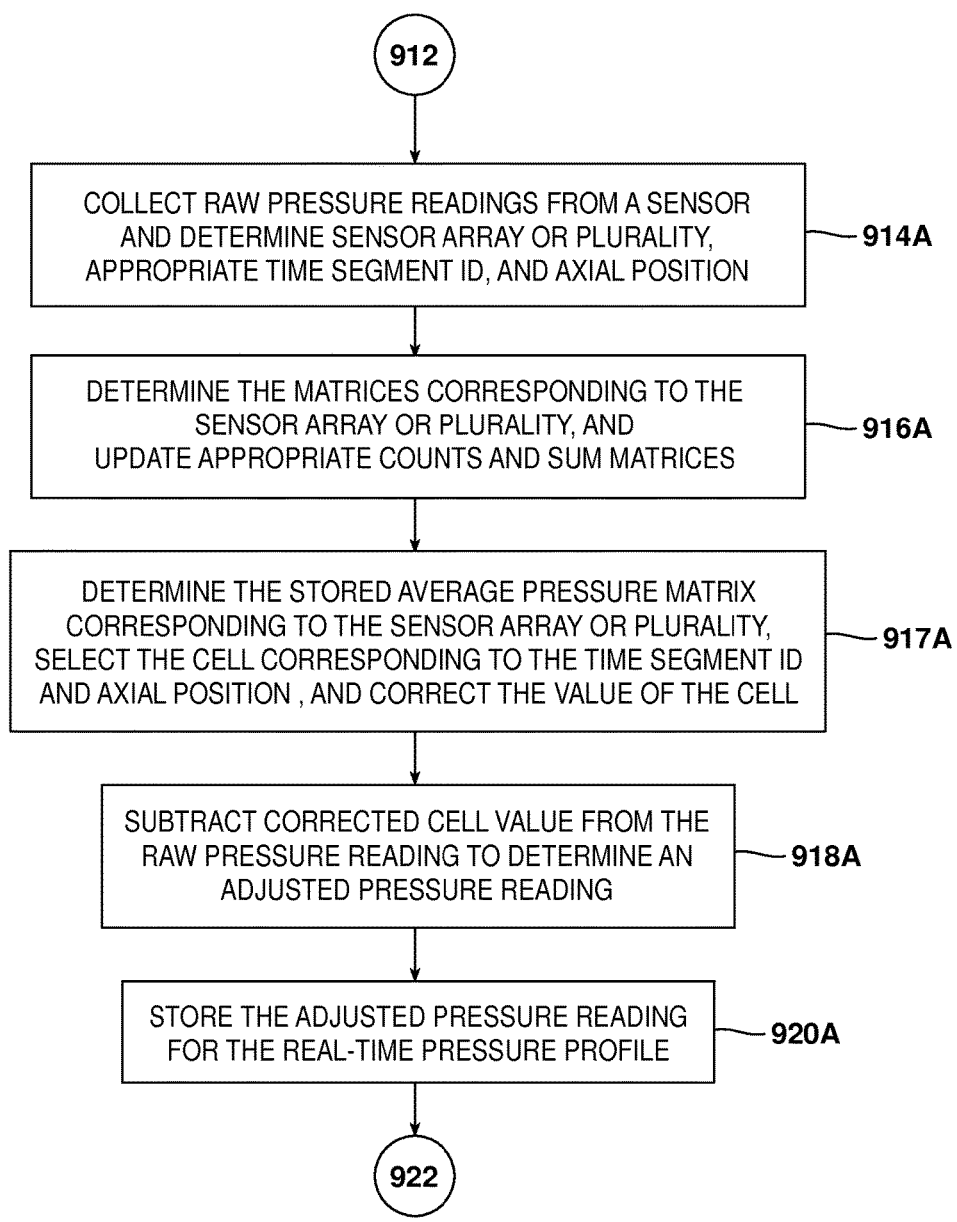

METHOD AND SYSTEM ASSOCIATED WITH A SENSING ROLL AND A MATING ROLL FOR COLLECTING DATA INCLUDING FIRST AND SECOND SENSOR ARRAYS

FIELD

The present invention relates generally to nip presses used to exert pressing forces on moving webs for the formation of, for example, paper, textile material, plastic foil and other related materials. In particular, the present invention is directed to methods and apparatus for measuring and removing the effects of rotational variability of a mating roll from the nip pressure profile, and constructing a synchronized map of the rotational variability of the mating roll to be used for diagnostic purposes such as detecting roll or bearing changes.

BACKGROUND

Nipped rolls are used in a vast number of continuous process industries including, for example, papermaking, steel making, plastics calendaring and printing. In the process of papermaking, many stages are required to transform headbox stock into paper. The initial stage is the deposition of the headbox stock, commonly referred to as "white water," onto a paper machine forming fabric, commonly referred to as a "wire." Upon deposition, a portion of the white water flows through the interstices of the forming fabric wire leaving a mixture of liquid and fiber thereon. This mixture, referred to in the industry as a "web," can be treated by equipment which further reduce the amount of moisture content of the finished product. The fabric wire continuously supports the fibrous web and transfers it to another fabric called a felt which advances it through the various dewatering equipment that effectively removes the desired amount of liquid from the web. Water from the web is pressed into the wet felt and then can be removed as the wet felt passes a suction box. Dry felts can also be used to support the fibrous web through steam dryers.

One of the stages of dewatering is effected by passing the web through a pair or more of rotating rolls which form a nip press or series thereof, during which liquid is expelled from the web via the pressure being applied by the rotating rolls. The rolls, in exerting force on the web and felt, will cause some liquid to be pressed from the fibrous web into the felt. The web can then be advanced to other presses or dry equipment which further reduce the amount of moisture in the web. The "nip region" is the contact region between two adjacent rolls through which the paper web passes. One roll of the nip press is typically a hard steel roll while the other is constructed from a metallic shell covered by a polymeric cover. However, in some applications both rolls may be covered or both may be hard steel. The amount of liquid to be pressed out of the web is dependent on the amount of pressure being placed on the web as it passes through the nip region. Later rolls in the process and nips at the machine calendar are used to control the caliper and other characteristics of the sheet. The characteristics of the rolls may define the amount of pressure applied to the web during the nip press stage.

One common problem associated with such rolls can be the lack of uniformity in the pressure being distributed along the working length of the roll. The pressure that is exerted by the rolls of the nip press is often referred to as the "nip pressure." The amount of nip pressure applied to the web and the size of the nip may determine whether uniform sheet characteristics are achieved. Even nip pressure along the roll is important in papermaking and contributes to moisture content, caliper, sheet strength and surface appearance. For example, a lack of uniformity in the nip pressure can often result in paper of poor quality. Excessive nip pressure can cause crushing or displacement of fibers as well as holes in the resulting paper product. Improvements to nip loading can lead to higher productivity through higher machine speeds and lower breakdowns (unplanned downtime).

Conventional rolls for use in a press section may be formed of one or more layers of material. Roll deflection, commonly due to sag or nip loading, can be a source of uneven pressure and/or nip width distribution. Worn roll covers may also introduce pressure variations. These rolls generally have a floating shell which surrounds a stationary core. Underneath the floating shell are movable surfaces which can be actuated to compensate for uneven nip pressure distribution.

Previously known techniques for determining the presence of such discrepancies in the nip pressure required the operator to stop the roll and place a long piece of carbon paper or pressure sensitive film in the nip. This procedure is known as taking a "nip impression." Later techniques for nip impressions involve using mylar with sensing elements to electronically record the pressures across the nip. These procedures, although useful, cannot be used while the nip press is in operation. Moreover, temperature, roll speed and other related changes which would affect the uniformity of nip pressure cannot be taken into account.

Control instrumentation associated with a sensing nip press can provide a good representation of the cross-directional nip pressure (commonly referred to as the "nip pressure profile" or just "nip profile") and will allow the operator to correct the nip pressure distribution should it arise. The control instruments usually provide a real time graphical display of the nip pressure profile on a computer screen or monitor. The nip profile is a compilation of pressure data that is being received from the sensors located on the sensing roll. It usually graphically shows the pressure signal in terms of the cross-directional position on the sensing roll. The y-axis usually designates pressure in pounds per linear inch while the x-axis designates the cross directional position on the roll.

SUMMARY

One aspect of the present invention relates to a system associated with a sensing roll and a mating roll for collecting roll data that includes a first array of sensors and a second array of sensors. The first array of sensors are located at axially spaced-apart locations of the sensing roll, wherein each sensor of the first array enters a region of a nip between the sensing roll and the mating roll during each rotation of the sensing roll to generate a first respective sensor signal. The second array of sensors located at axially spaced-apart locations of the mating roll, wherein each sensor of the second array enters a region of the nip between the sensing roll and the mating roll during each rotation of the mating roll to generate a second respective sensor signal. The system also includes a periodically occurring first time reference associated with each rotation of the mating roll, and a periodically occurring second time reference associated with each rotation of the sensing roll. A processor receives a received sensor signal, wherein the received sensor signal is one of the first respective sensor signal or the second respective sensor signal, and, upon receiving the received sensor signal, the processor performs a variety of operations. The processor operates to determine a particular one of the sensors of the first array or second array which generated the received sensor signal. When the particular one sensor is from the first array, then based upon a first amount of time that has elapsed since a most recent first time reference, the processors determines a detected tracking segment based on which one of a plurality of first tracking segments associated with the mating roll enters the region of the nip substantially concurrently with the particular one sensor from the first array. When the particular one sensor is from the second array, then based upon a second amount of time that has elapsed since a most recent second time reference, the processor determines a detected tracking segment based on which one of a plurality of second tracking segments associated with the sensing roll enters the region of the nip substantially concurrently with the particular one sensor from the second array. Ultimately, the processor stores the received sensor signal using the detected tracking segment.

In certain related aspects of the invention the first time reference is based on when a first selected sensor of the second array of sensors periodically enters the region of the nip; and the second time reference is based on when a second selected sensor of the first array of sensors periodically enters the region of the nip.

In related aspects of the invention, each of the plurality of first tracking segments are of substantially equal size, or of different sizes, and each of the plurality of second tracking segments are of substantially equal size, or of different sizes. Furthermore, the first and second tracking segments, relative to each other, may also be of equal size or of different sizes. Also, the received sensor signal comprises a pressure value.

In a related aspect of the invention the processor receives the first respective sensor signal for each of the sensors of the first array during each rotation of the sensing roll, and the second respective sensor signal for each of the sensors of the second array during each rotation of the mating roll. The processor also receives a plurality of sensor signals which include a plurality of first respective sensor signals occurring during a plurality of rotations of the sensing roll, and a plurality of second respective sensor signals occurring during a plurality of rotations of the mating roll. For each one of the plurality of sensor signals the processor identifies its detected tracking segment, an associated axial segment, and whether this particular one of the plurality of sensor signals is generated from the first array of sensors or from the second array of sensors.

In another related aspect of the invention the mating roll and the sensing roll each, respectively, comprises n axial segments and m tracking segments, wherein, for the first array of sensors, there are (n times m) unique permutations, respectively, that are identifiable by a two-element first set comprising a respective first axial segment index value and a respective first tracking segment index value and for the second array of sensors, there are (n times m) unique permutations, respectively, that are identifiable by a two-element second set comprising a respective second axial segment index value and a respective second tracking segment index value. If different values of axial segments and tracking segments are provided, then for the second array of sensors there may be, for example, (p times q) unique permutations which are different than the (n times m) unique permutations.

In yet a further related aspect, for the plurality of first respective sensor signals and for a first plurality of the possible (n times m) permutations, the processor determines an average of all the plurality of respective first sensor signals associated with a mating roll axial segment and first tracking segment matching each of the first plurality of permutations. Also, for the plurality of second respective sensor signals and for a second plurality of the possible (n times m) permutations, the processor determines an average of all the plurality of respective second sensor signals associated with a sensing roll axial segment and detected second tracking segment matching each of the second plurality of permutations.

Also, for the plurality of first respective sensor signals and each of a first plurality of the possible (n times m) permutations, the processor determines: a) a number of times one or more of the plurality of first respective sensor signals are associated with a mating roll axial segment and first tracking segment matching that permutation; and b) a summation of all of the plurality of first respective sensor signals associated with the mating roll axial segment and first tracking segment matching that permutation. For the plurality of second respective sensor signals and each of a second plurality of the possible (n times m) permutations, the processor determines: a) a number of times one or more of the plurality of second respective sensor signals are associated with a sensing roll axial segment and second tracking segment matching that permutation; and b) a summation of all of the plurality of second respective sensor signals associated with the sensing roll axial segment and second tracking segment matching that permutation. A respective average pressure value is associated with each of the (n times m) unique permutations of each of the first and second sets, each of the respective average pressure values based on previously collected pressure readings related to the nip.

In a related aspect of the invention, the plurality of first tracking segments associated with the mating roll are either a plurality of circumferential segments on the mating roll or a plurality of time segments of a period of the mating roll. Also, the plurality of second tracking segments associated with the sensing roll are either a plurality of circumferential segments on the sensing roll or a plurality of time segments of a period of the sensing roll.

In a related aspect of the invention, the system includes a first respective column average value that is associated each first axial segment index value, each first respective column average value comprising an average of the m respective average pressure values, from the first set, associated with that first axial segment index value, and a second respective column average value that is associated each second axial segment index value, each second respective column average value comprising an average of the m respective average pressure values, from the second set, associated with that second axial segment index value.

In another related aspect of the invention, the processor operates on each of the received sensor signals. In particular, for each one of the received sensor signals that defines a pressure reading the processor a) determines a particular first or second axial segment index value and a particular first or second tracking segment index value based on that signal's associated axial segment, its detected tracking segment, and whether that signal is generated from the first array of sensors or the second array of sensors, b) selects the respective average pressure value associated with the particular first or second axial segment index value and the particular first or second tracking segment index value, c) calculates a respective corrected average pressure value by subtracting one of the first respective column average value or second respective column average value associated with the particular first or second axial segment index value from the selected respective average pressure value, and d) calculates a respective adjusted pressure reading value by subtracting the respective corrected average pressure value from the one received sensor signal. The processor can also operate to calculate an average pressure profile based on the respective adjusted pressure reading values.

In a related aspect of the invention, the system includes a first signal generator to generate a respective first trigger signal to define the periodically occurring first time reference; and a second signal generator to generate a respective second trigger signal to define the periodically occurring second time reference.

In related aspects of the present invention, the system includes a third array of sensors located at axially spaced-apart locations of a second mating roll, wherein each sensor of the third array enters a region of a second nip between the sensing roll and the second mating roll during each rotation of the sensing roll to generate a third respective sensor signal. Also, the processor receives the third respective sensor signal. Upon receiving the third respective sensor signal, the processor operates to: a) determine a particular one of the sensors of the third array which generated the third respective sensor signal, b) determine a detected tracking segment of the sensing roll based on which one of a plurality of third tracking segments associated with the sensing roll enters the region of the second nip substantially concurrently with the particular one sensor from the third array, and c) store the third respective sensor signal using the detected tracking segment of the sensing roll.

Another aspect of the present invention relates to a method associated with a sensing roll and a mating roll for collecting roll data. The method includes generating a first respective sensor signal from each sensor of a first sensor array located at axially spaced-apart locations of the sensing roll, wherein each first respective sensor signal is generated when each sensor enters a region of a nip between the sensing roll and the mating roll during each rotation of the sensing roll; and generating a second respective sensor signal from each sensor of a second sensor array located at axially spaced-apart locations of the mating roll, wherein each second respective sensor signal is generated when each sensor enters a region of a nip between the sensing roll and the mating roll during each rotation of the mating roll. The method includes identifying a periodically occurring first time reference associated with each rotation of the mating roll and identifying a periodically occurring second time reference associated with each rotation of the sensing roll. The method also includes receiving a received sensor signal, the received sensor signal comprising one of the first respective sensor signal and the second respective sensor signal and, upon receiving the received sensor signal, and determining a particular one of the plurality of sensors which generated the received sensor signal. When the particular one sensor is from the first sensor array, then based upon a most-recent-identified first time reference, a determination is made of a detected tracking segment based on which one of a plurality of first tracking segments associated with the mating roll enters the region of the nip substantially concurrently with the particular one sensor from the first array. When the particular one sensor is from the second sensor array, then based upon a most-recent-identified second time reference, a determination is made of a detected tracking segment based on which one of a plurality of second tracking segments associated with the sensing roll enters the region of the nip substantially concurrently with the particular one sensor from the second array. The method also includes storing the received sensor signal using the detected tracking segment.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements.

FIG. 2 is a side elevation view of a sensing roll showing the placement of a line of sensors in accordance with the principles of the present invention.

FIGS. 4A and 4B illustrate a table outlining how different mating roll circumferential segments are sensed by sensing roll sensors during multiple rotations of a sensing roll in accordance with the principles of the present invention.

FIGS. 6, 7, 8A and 8B depict matrices of different values that can be calculated for various axial segments and circumferential segments of a mating roll in accordance with the principles of the present invention.

FIG. 9 depicts a flowchart of an example method of generating a real-time average pressure profile in accordance with the principles of the present invention.

FIG. 11 is an elevation view of an alternative sensing roll having two lines of sensors in accordance with the principles of the present invention.

FIG. 12 is a side elevation view of a mating roll having its own line of sensors in accordance with the principles of the present invention.

FIG. 13 is a flowchart of one example modification to how a data collection session according to FIG. 9 may change when multiple sensor arrays are used in collecting nip pressure data in accordance with the principles of the present invention.

DETAILED DESCRIPTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
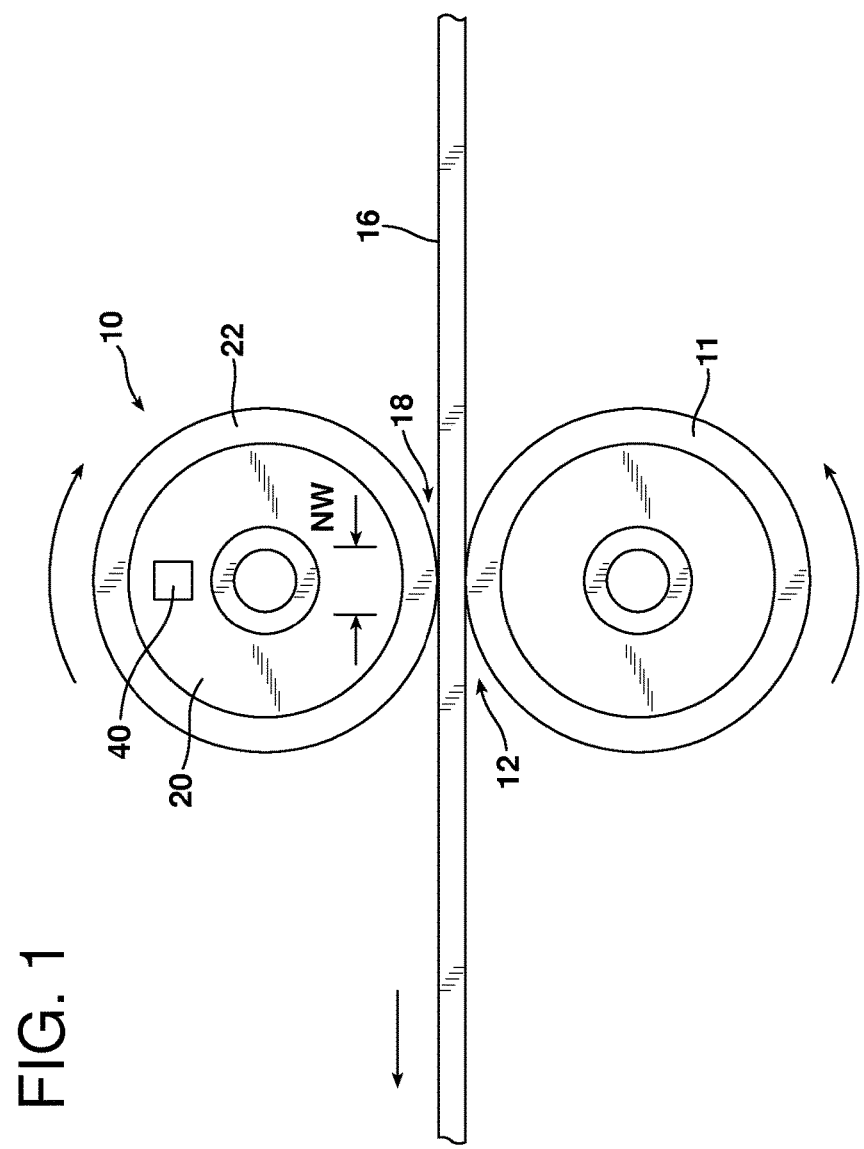
FIG. 1 is an end, schematic view of a nip press, in accordance with the principles of the present invention, showing the formation of a web nipped between the nip rolls, the nip width of the nip press being designated by the letters "NW."

As illustrated in FIG. 1, a sensing roll 10 and a mating roll 11 define a nip 12 receiving a fibrous web 16 to apply pressure to the web 16. It is contemplated that, in some cases, a felt may support the web such that the felt and the web enter the nip 12. The sensing roll 10 comprises an inner base roll 20 and an outer roll cover 22. As shown in FIG. 2, a set 24 of sensors 26 is disposed at least partially in the roll cover 22. The set 24 of sensors 26 may be disposed along a line that spirals around the entire length of the roll 10 in a single revolution to define a helical pattern, which is a common sensor geometry arrangement for roll covers. However, the helical pattern is merely an example and any arrangement is contemplated in which at least one sensor is placed at each axial position, anywhere along the circumference, at which data is to be collected. Each sensor 26 can, for example, measure the pressure that is being exerted on the sensor when it enters a region of the nip 12 between the rolls 10 and 11. In particular, the set 24 of sensors 26 may be positioned in the sensing roll 14, for example, at different axial locations or segments along the sensing roll 10, wherein the axial segments are preferably equally sized. In the illustrated embodiment, there are fourteen axial segments, labelled 1-14 in FIG. 2, each having one sensor 26 located therein. It is also contemplated that the set 24 of sensors 26 may be linearly arranged so as to define a line of sensors, i.e., all sensors reside at the same circumferential location. One of ordinary skill will readily recognize that more than fourteen, or less than fourteen, axial segments may be provided as well along with a corresponding equal number of axially-spaced sensors located on the sensing roll. Also, in the description below, each sensor 26 may be referred to as a pressure sensor, for example, but other types of sensors are also contemplated such as, for example, temperature sensors.

Because having even nip pressure is beneficial during paper manufacturing, correctly calculating and displaying the nip pressure profile are also beneficial since any corrections or adjustments to be made to the rotating rolls based on an inaccurate calculated nip pressure profile could certainly exacerbate any operational problems. There are three primary measurements of variability. The nip pressure profile has variability that can be termed cross-directional variability as it is the variability of average pressure per cross-direction position across the nip. Another type of variability represents the variability of the high speed measurements at each position in the single line of sensors. This variability represents the variability of other equipment in the paper making process including the rotational variability of the mating roll, i.e., the roll nipped to the sensing roll. The third variability in the nip profile includes the variability of multiple sensors at each cross-directional position of the roll. This variability represents the "rotational variability" of the sensing roll as it rotates through its plurality of sensing positions.

Typically, the sensing roll 10 and the mating roll 11 are sized differently, i.e., they have a different size radially and circumferentially. Each roll may have variations in its size circumferentially across the axial dimension. Further, as the roll rotates, the distance from the central axis (radial dimension) to the outer surface may vary for each axial position at the same angle of rotation even were the circumferential dimensions to be the same for each axial position.

For example, rolls are periodically ground which results is small arbitrary changes in diameter from the manufacture's specification. There may also be slippage with one or more of the rolls resulting in the sensing roll surface traveling at a speed that is different than the mating roll surface. Consequently, it is rare that two rolls would have exactly the same period of rotation or have periods that are exact harmonics.

Thus, as the sensing roll 10 and mating roll 11 travel through multiple rotations relative to one another, a particular sensor 26 may not always enter the region of the nip 12 with the same circumferential portion of the mating roll 11 as it did in a previous rotation. This behavior can be utilized to create data maps corresponding to the surface of the mating roll 11, as described below. These data maps can include an average pressure matrix as described more fully below with respect to FIG. 8A. Different average pressure matrices, each collected and built during different periods of time can be compared with one another to investigate how they vary from one another. Variability between the different data maps can indicate possible problems with the mating roll 11, such as roll surface irregularities, bearing wear, and roll flexing. Variability analysis of the sensor data may indicate possible problems with upstream or downstream processing equipment, e.g., upstream rolls or downstream rolls.

The sensing and mating rolls 10 and 11 may be each separated into 14 axial segments. All of the axial segments on the sensing roll 10 may or may not be of the same length, and all of the axial segments on the mating roll 11 also may or may not be of the same length. In the illustrated embodiment, it is presumed that all of the axial segments on the sensing roll 10 are of the same length and all of the axial segments on the mating roll 11 are of the same length. The axial segments on the sensing roll 10 may be aligned with the axial segments on the mating roll 11. Furthermore, the mating roll 11 may be separated into individual circumferential segments such as, for example, 50 circumferential segments, all of substantially the same dimension.

Figure 3C:
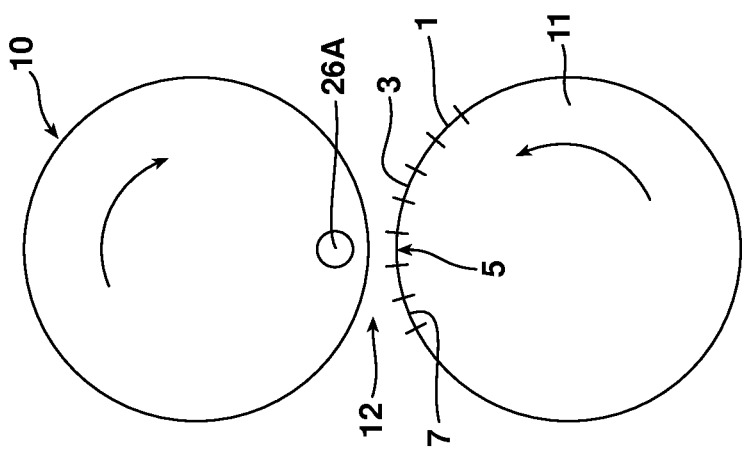
FIGS. 3A-3C illustrate a progression of different circumferential segments of a mating roll entering a nip during multiple rotations of a sensing roll in accordance with the principles of the present invention.
Figure 3B:
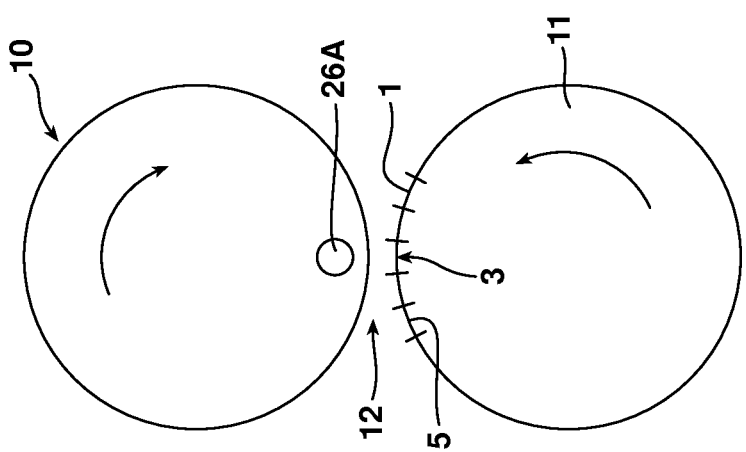
Figure 3A:
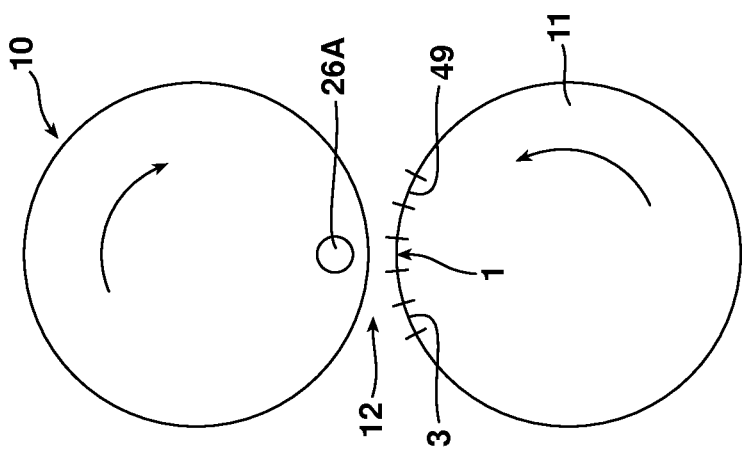

Referring to FIGS. 3A-3C, the sensing roll 10 can be, for example, rotating and be instantaneously positioned such that a sensor 26A, located in one of the 14 axial segments in the illustrated embodiment, is located in the region of the nip 12 simultaneously with mating roll circumferential segment number 1 (of 1-50 segments). After a first full rotation of the roll 10, the one sensor 26A may enter the region of the nip 12 concurrently with a different circumferential segment, for example segment number 3, on the mating roll 11, see FIG. 3B. Because the rolls 10 and 11 have different periods, after a second full rotation of the roll 10, the one sensor 26A may enter the region of the nip 12 simultaneously with yet a different mating roll circumferential segment, for example segment number 5, see FIG. 3C. Because the one sensor 26A enters the region of the nip 12 concurrently with different circumferential segments of the mating roll 11, the nip pressure measured by the one sensor 26A may vary during sequential roll rotations due to the change in pressure caused by the mating roll 11. Aspects of the present invention contemplates mapping readings, or signals, from each sensor 26 of the set 24 over time to see how the pressure readings, or signals, vary for each sensor due to each sensor entering the region of the nip 12 concurrently with different circumferential segments of the mating roll 11. As noted above, the mapped data may be used to determine possible problems with the mating roll 11 and, as also noted above, variability analysis may indicate possible problems related to upstream or downstream processing equipment other than the sensing roll 10 and the mating roll 11.

Hence, the present invention contemplates using sensors 26 to measure for rotational variability that is generated by the high speed rotation of the mating roll 11 when pressure signals, or readings, from the sensors 26 are time synchronized to the mating roll position. In order to measure for rotational variability, the mating roll 11 must have some impact on the pressure in the nip 12 to be measured. The dominant impact on the sensed nip pressure will likely be that of the mating roll 11 which directly presses against the sensing roll 10. However, it may be possible to synchronize sensor measurements with upstream rolls (not shown) which form another nip and impact the water content and thickness of the web which affect the nip pressure seen by the sensing roll 10. Furthermore, as rolls (not shown) in a downstream nip may pull the web and cause changes in web tension, it may be possible to also synchronize sensor measurements with these rolls. The sensing and mating rolls 10 and 11 will be used to illustrate the principles of this invention; however all principles are applicable to upstream and downstream processing equipment, such as upstream and downstream rolls.

As one particular example, the mating roll 11 can be larger in circumference than the sensing roll 10. For example, the mating roll 11 has a circumference that is divided into 50 substantially equal-length circumferential segments and the sensing roll 10 has its own circumference that is smaller than the circumference of the mating roll 11. Differences in circumference and slippage both contribute to a difference in rotational period (period=the time required for a roll to make one full rotation) between the sensing roll 10 and mating roll 11. One convenient way to characterize the difference in periodicity is using units-of-measure that measure that difference in terms of time segments, e.g., 50 time segments in the illustrated embodiment. The length of each time segment is the mating roll period divided by the number of predefined time segments. As discussed below, the predefined number of time segments may correspond to a predefined number of mating roll circumferential segments. A period of the sensing roll 10 can be described as being x time segments smaller/larger than a period of the mating roll 11. For example, the sensing roll 10 may have a period that is 2.14 mating roll time segments less than the period of the mating roll 11 (equivalently, the mating roll 11 can have a period that is 2.14 mating roll time segments larger than the period of the sensing roll). In such an example, as the sensing roll 10 makes one complete revolution, the mating roll 11 will make less than a complete revolution by an amount equal to 2.14 time segments due to it having a longer period than the sensing roll 10.

As noted above, the 50 time segments of the mating roll period can correspond to 50 circumferential segments around the mating roll 11. Thus, even though, at a conceptual level, it is the period of the mating roll 11 that is being separated into a plurality of time segments, that concept can correspond to a physical circumference of the mating roll 11, wherein each individual time segment of the mating roll period also corresponds to a circumferential segment around the mating roll 11. Accordingly, differences in rotational periods between the sensing roll 10 and the mating roll 11 measured in units of "time segments" can just as easily be considered in units of "circumferential segments." In the description of embodiments of the present invention below, reference to "circumferential segments" is provided as an aid in understanding aspects of an example embodiment of the present invention. However, one of ordinary skill will recognize that "time segments" and mating roll periodicity could be utilized as well without departing from the scope of the present invention. The "circumferential segments" and "time segments" can also be referred to generically as "tracking segments"; this latter term encompassing both types of segments associated with the mating roll 11.

As noted above, in one particular example, the mating roll 11 can be larger in circumference than the sensing roll 10. For example, the mating roll 11 can have a circumference that is divided into 50 substantially equal-length circumferential segments and the sensing roll 10 can have its own circumference that may be smaller than the circumference of the mating roll 11. One convenient way to characterize the difference in circumferences is using units-of-measure that measure that difference in terms of the length of the 50 mating roll circumferential segments. In other words, a circumference of the sensing roll 10 can be described as being x segment-lengths smaller/larger than a circumference of the mating roll 11. For example, the sensing roll 10 may have a circumference that is 2.14 mating roll circumferential segment lengths less than the circumference of the mating roll 11 (equivalently, the mating roll 11 can have a circumference that is 2.14 mating roll segments larger than the circumference of the sensing roll). In such an example, as the sensing roll 10 makes one complete revolution, the mating roll 11 will make less than a complete revolution by an amount equal to 2.14 circumferential segment lengths due to it being larger in circumference than the sensing roll 10 and presuming outer surface portions of the sensing roll 10 and mating roll 11 in the nip 12 both match the velocity of the web 16.

Continuing with this example, FIGS. 4A-4B illustrate how sensor data for particular circumferential segments (or, alternatively, time segments) corresponding to a same axial location of the mating roll 11 are collected for one particular sensor 26 of the set 24. Similar data will be collected for each of the remaining sensors 26 of the set 24. The left-most column 1000 represents a number of revolutions of the sensing roller 10. If it is presumed that this particular sensor 26 starts when it is concurrently in the region of the nip 12 with circumferential segment number 1 of the mating roll 11, then after 1 revolution, the sensor 26 will enter the region of the nip concurrent with segment number 3 of the mating roll 11. The second column 1002 from the left represents the circumferential segment number of the mating roll 11 which enters the nip region concurrent with the sensor 26 for each successive revolution of the sensing roll 10. For example, after 14 rotations, the segment number 30 (see element 1003 of FIG. 4A) enters the region of the nip 12 concurrent with the sensor 26. Only the first 50 revolutions are depicted in FIGS. 4A-4B; however, any number of revolutions, e.g., 500 revolutions, could be observed to collect even more data.

Figure 5:
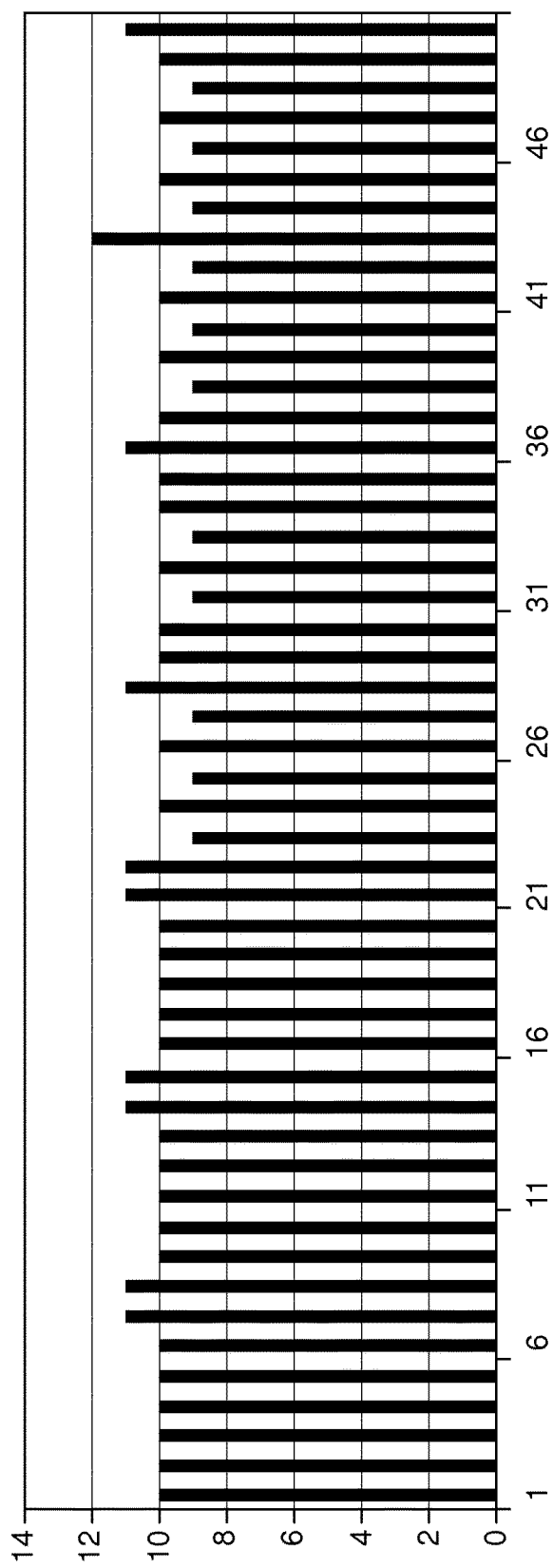
FIG. 5 is a distribution graph of an example sampling frequency of different circumferential segments of a mating roll in accordance with the principles of the present invention.

The two right most columns 1004, 1006 relate to collection of data for 500 revolutions of the sensing roll 10. Column 1004 represents each of the 50 segments and column 1006 represents how many times each of the segments were respectively sampled in the 500 revolutions. For example, circumferential segment number 28 of the mating roll 11 was sampled (i.e., in the nip region concurrently with the sensor 26) by the sensor 26 eleven (see element 1005 of FIG. 4A) different times during the 500 revolutions. FIG. 5 depicts a distribution chart showing how many times each of the 50 circumferential segments were sampled by the sensor 26 during 500 revolutions. Depending on the difference in circumference (or periodicity) between the sensing roll 10 and the mating roll 11, the number of times each of the 50 segments is sampled can vary.

Figure 10:
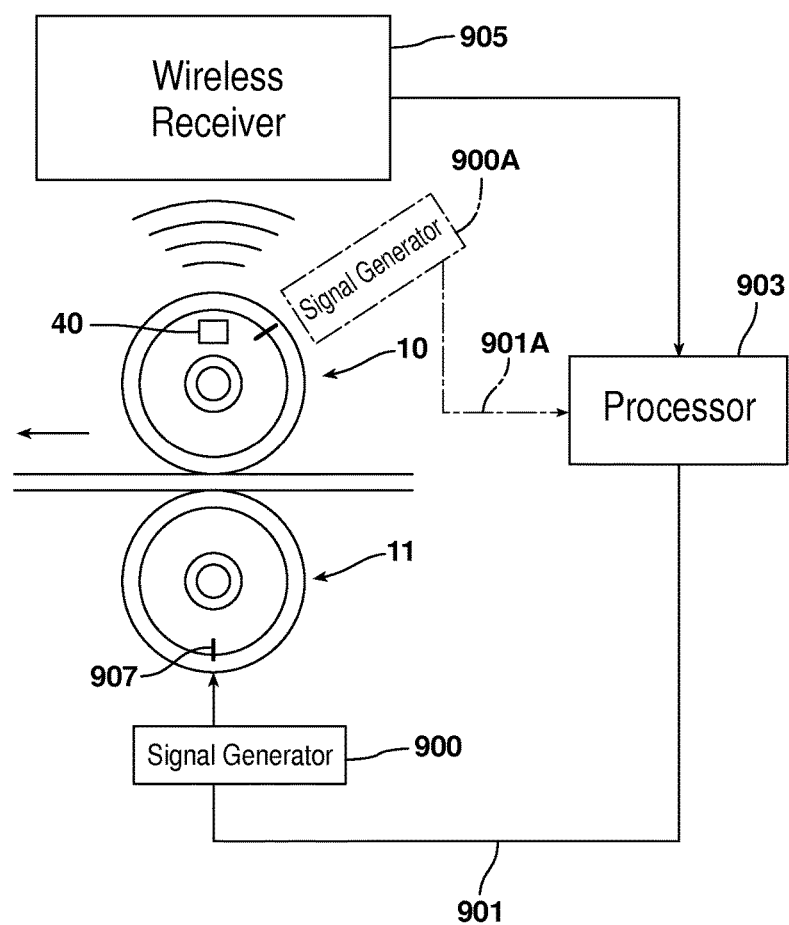
FIG. 10 is a schematic drawing showing the basic architecture of a particular monitoring system and paper processing line in accordance with the principles of the present invention.

As mentioned above, data similar to that of FIGS. 4A-4B is captured for each sensor 26 of the set 24. Thus, as each sensor 26 arrives at the region of the nip 12 and senses a pressure reading, a particular mating roll outer surface portion at an axial location corresponding to that sensor and at one of the 50 circumferential segments of the mating roll 11 will also be in the nip 12. Determining the mating roll segment that is in the nip 12 can be accomplished in a variety of different ways. One way involves indexing a particular one of the 50 mating roll segments with a trigger signal that is fired each time the mating roll 11 completes one revolution; a time period since the last trigger signal can be used to determine which of the 50 segments (measured relative to the indexed segment) is in the nip 12. For example, if the time between each firing of the trigger signal is 275 ms, then each time segment is 5.5 ms, which corresponds to one of the 50 mating roll circumferential segments. A pressure signal generated by a sensor 26 in the nip region occurring at 55 ms after the trigger signal would be assigned to time segment 10 as ten 5.5 ms segments will have passed, e.g., the nip region, from when the trigger signal is made to when the pressure signal is generated. FIG. 10 is described below in the context of a processor 903 generating a real-time nip profile. In addition, the processor 903 can also receive a trigger signal 901 related to the rotation of the mating roll 11. As just described, some circumferential segment or position 907 of the mating roll 11 can be indexed or encoded such that a signal generator 900 detects and generates the trigger signal 901 each time the signal generator 900 determines that the segment 907 of the mating roll 11 completes another full rotation. When the mating roll 11 is rotated such that the circumferential position or segment 907 is aligned with a detector portion of the signal generator 900, then the one of the 50 circumferential segments that happens to be positioned in the nip region can arbitrarily be labeled as the first circumferential segment such that the other circumferential segments can be numbered relative to this first segment. This particular rotational position of the mating roll 11 can be considered a reference position. As the mating roll 11 rotates, its rotational position will vary relative to that reference position and the amount of this variance determines which of the 50 circumferential segments will be positioned in the nip region. Accordingly, based on the rotational position of the mating roll 11 relative to that reference position a determination can be made as to which of the 50 circumferential segments is in the nip region when a particular sensor 26 generates a pressure signal.

There are other ways to determine the position of the mating roll 11. One way is to use a high precision tachometer that divides the rotation of the roll 11 into a number of divisions, perhaps 1000. In this example, each time segment would be 20 positions on the high precision tachometer. All methods of determining the position of the mating roll are included in this invention.

In an example environment in which there are 14 axially arranged sensors 26, each of which can be uniquely referred to using an axial segment index value that ranges from "1" to "14", and there are 50 circumferential segments on the mating roll 11 (or time segments), each of which can be uniquely referred to using a tracking segment index value ranging from "1" to "50", there are 7000 (i.e., 50×14=7000) unique permutations of pairs consisting of a sensor number and a circumferential segment number (or time segment number), wherein each permutation is identifiable by a two-element set comprising a respective axial segment index value and a respective tracking segment index value. In the illustrated embodiment, the sensor numbers also correspond to the mating roll axial segments. Therefore the data collected can be considered a 50×14 matrix as depicted in FIG. 6. Each row of FIG. 6 represents one of the 50 mating roll circumferential segments (or time segments) and each column represents one of the 14 axially arranged sensors 26 and, thus, each cell represents one of the possible 7000 permutations. Each column also corresponds to a mating roll outer surface portion at an axial location corresponding to the sensor 26 assigned that column. Each cell represents a combination of a sensor number (or axial segment number) and a particular mating roll circumferential segment (or time segment). For example, cell 100 represents a value that will relate to a pressure reading that occurred when sensor number 14 (number 14 of the 1-14 sensors defining the set 24) entered the region of the nip 12 concurrently with a mating roll outer surface portion at an axial location corresponding to sensor number 14 and mating roll circumferential segment number 1 (or time segment number 1). Thus, each cell of the matrix represents a unique permutation from among all the possible permutations of different axial segment numbers (e.g., 1-14) and circumferential segment numbers (e.g., 1-50) (or time segments 1-50). A value stored in a particular matrix element is thereby associated with one particular permutation of possible axial segments numbers and circumferential segment numbers (or time segments).

The matrix of FIG. 6 can, for example, be a "counts" matrix wherein each cell represents the number of times a particular sensor and a particular mating roll outer surface portion at an axial location corresponding to that sensor and a particular mating roll circumferential segment were concurrently in the region of the nip 12 to acquire a pressure reading value. FIG. 7 illustrates a similarly sized matrix (i.e., 50×14) but the values within the matrix cells are different from those of FIG. 6. The cell 200 still represents a value that is related to sensor number 14 (or axial segment 14, out of 1-14 axial segments, of the mating roll 11) and circumferential segment 1 but, in this example, the value is a cumulative total of pressure readings, e.g., in pounds/inch$^2$, acquired by the sensor for that circumferential segment during a plurality of rotations of the sensing roll 10. Thus, each time sensor number 14 happens to enter the region of the nip 12 along with the circumferential segment number 1, the acquired pressure reading value is summed with the contents already in the cell 200. Each of the 7000 cells in this matrix of FIG. 7 is calculated in an analogous manner for their respective, associated sensors and segments.

From the matrices of FIG. 6 and FIG. 7, an average pressure matrix depicted in FIG. 8A can be calculated. For example, cell 100 includes the number of pressure readings associated with sensor number 14 (or axial segment 14 of the mating roll 11) and circumferential segment number 1 while cell 200 includes the total or summation of all those pressure readings. Thus, dividing cell 200 by cell 100 provides an average pressure value for that particular permutation of sensor number and mating roll circumferential segment number which entered the region of the nip 12 concurrently.

As a result, the matrix of FIG. 8A represents an average pressure value that is sensed for each particular sensor number and mating roll circumferential segment number. The length of time such data is collected determines how many different pressure readings are used in such calculations.

The raw pressure readings, or signals, from the sensors 26 can be affected by a variety of components in the system that moves the web 16. In particular, the average values in the average pressure matrix of FIG. 8A are related to variability synchronized to the mating roll 11. However, there may be other variability components that are not synchronized with the mating roll 11 such as variability in a cross direction (CD), shown in FIG. 2. One measure of this CD variability is captured by calculating an average for each column of the average pressure matrix. Thus, the average pressure matrix of FIG. 8A can also include a row 302 that represents a column average value. Each of the 14 columns may have 50 cells that can be averaged together to calculate an average value for that column. For example, cell 304 would be the average value in the 50 cells of the second column of the average pressure matrix. As more fully described below, a corrected cell value can be calculated by subtracting from each cell in the average pressure matrix its corresponding column average value from row 302. Thus, the average pressure matrix in FIG. 8A includes average pressure values in each cell and information needed to correct those values in row 302.

Alternatively, one of ordinary skill will recognize that an entirely separate correction matrix (having, for example, 7000 elements or cells) could be constructed that is filled with already-corrected values from each of the cells of the average pressure matrix. Thus, a correction matrix, as illustrated in FIG. 8B, could be created that is separate from the average pressure matrix of FIG. 8A. Each cell (e.g., cell 310) of the correction matrix has a value that is based on the corresponding cell (e.g., 300) of the average pressure matrix. More particularly, the value from each average pressure matrix cell is corrected by subtracting an appropriate column average value found in row 302 to determine a corrected value to store in a corresponding cell of the correction matrix of FIG. 8B.

Individual collection sessions of pressure readings to fill the matrices of FIGS. 6, 7, 8A and 8B may be too short to build robust and complete matrices due to data buffer and battery life limitations of data acquisition systems in communication with the sensing roll 10. In such cases, consecutive collection sessions can be combined by not zeroing the matrices (i.e., counts and summation matrices) upon starting a new collection session or combining the separate matrices collected in a post hoc fashion. Consequently, collections may be stopped and restarted without loss of data fidelity as long as the synchronization of the mating roll is maintained. In particular, combining multiple collection sessions that are separated by gaps in time can be beneficial to help populate the matrices. For example, if the period difference between the two rolls were closer to 2.001 instead of 2.14 time/circumferential segments, the collection would have a tendency to collect only evenly numbered time/circumferential segments in the short term (i.e., evenly numbered segments are those that are offset an even number of segments from a starting segment) until sufficient time has passed to move the collection into the odd numbered time/circumferential segments. Combining collection sessions separated by a long time delay may help to shift the collection so that data is more uniformly captured for all the different time/circumferential segments because there is no expectation that the period of the mating roll will be related to arbitrary time gaps between collection sessions.

Accordingly, a data collection "protocol" or set, e.g., data collection sessions occurring over a 24 hour period, can include data from one or more data collection sessions. Each data collection session may typically include continuous collection of data for a brief time (e.g., two minutes, five minutes, ten minutes, etc.) that is repeated periodically (e.g., once every hour). A data collection set can include all of the data collection sessions that occur in a day. When each new data collection protocol or set begins, a counts matrix and a summation matrix from a most-recently-completed data collection set can be reset to zero so that the data for that new data collection protocol or set is independent of previously collected data. However, an average pressure matrix, and optionally a corresponding correction matrix, from the most-recently-completed data collection set may not be zeroed-out but may be stored for use during each of the collection sessions that are part of the new (i.e., next) data collection set. Once this new data collection set is finished, then a new average pressure matrix and correction matrix can be calculated and used to overwrite the stored average pressure matrix and correction matrix. In this way, pressure-related parameters about the mating roll can be collected and compared at different times for diagnostic purposes, for example, or to potentially adjust current operating conditions of the rolls 10 and 11.

Other matrices, not shown, can be calculated based on the sensor data used to build the matrices of FIGS. 6, 7, 8A and 8B. For example, squaring the pressure values used to build the matrix of FIG. 7, and then summing those squared values can be done to build a sum-squared matrix which can be useful in partitioning of variability into cross-directional (CD) variability, rotational variability, 2-dimensional variability, and residual variability. The variability partitions can be trended for operational and/or maintenance purposes.

The average pressure matrix of FIG. 8A can be generated during a set of collection sessions in an attempt to monitor and measure the operating characteristics of how the web 16 is being compressed by the rolls 10 and 11. The data from the average pressure matrix of FIG. 8A or from the correction matrix of FIG. 8B can then be used during a collection session of a subsequent set of collection sessions to correct raw or real-time pressure readings from the sensors 26 for any rotational impact of the mating roll 11. Within the present disclosure the data sensed, or acquired, by a sensor (e.g., 26) can be referred to as either a "signal" or a "reading" as in a "raw pressure reading", a "real-time pressure reading", a "pressure signal", or a "sensor signal". Correction of each of the raw or real-time pressure readings results in a respective "adjusted pressure reading value". These adjusted real-time pressure values can be used to initiate or update a real-time average pressure profile for the nip between the rolls 10 and 11, as will be discussed below. At the start of each new collection session, the real-time average pressure profile can be reset to zero. The real-time average pressure profile may be used to adjust loading pressures and roll crowns or roll curvature (using, for example, internal hydraulic cylinders) to achieve a flat pressure profile.

As more fully explained with respect to the flowchart of FIG. 9, a raw or real-time pressure reading (i.e., sensor signal) can be acquired from each sensor 26 each time it enters the nip 12. As noted above, each raw pressure reading, or sensor signal, can be adjusted using the average pressure value information in the matrices of FIG. 8A and/or FIG. 8B to calculate an adjusted pressure reading value. In particular, these matrices may have been created from a previous data collection set, such as from a day earlier. The adjusted pressure reading values may then be used by the processor 903 to initiate or update a real-time average pressure profile.

The flowchart of FIG. 9 depicts an exemplary method of generating a real-time average pressure profile in accordance with the principles of the present invention. In step 902, the collection of data is begun. The start of data collection could occur when a sensing roll 10 and/or a mating roll 11 is first brought online or could occur after a maintenance period or other work stoppage. Accordingly, in some instances, a previously calculated and stored average pressure matrix could be beneficial in adjusting subsequent raw pressure readings and in other instances it may be beneficial to perform data collection without using any previous data about the nip 12.

Thus, in step 904, a determination is made as to whether a stored average pressure matrix exists and whether or not to use it in the current data collection process started in step 902. If the average pressure matrix does not exist, or if it exists and a choice is made not to use it, then in step 906 all the cells of the average pressure matrix are zeroed out so that the matrix is initialized to a known state.

Otherwise, values of a stored average pressure matrix are used as described below. As previously mentioned it may be beneficial to have records of different average pressure matrices so that they can be compared to one another to possibly identify trends or issues relating to maintenance or operating conditions. Thus, part of step 904 may include presenting an operator with a list of available average pressure matrices that are stored so that the operator can select a particular matrix to be used. In the illustrated embodiment, typically the average pressure matrix from a previous collection session set, i.e., from one day earlier, is selected.

In some instances data collection during a set of collection sessions can be interrupted for various operational reasons. Therefore, it may be beneficial to be able to resume a set of collection sessions without starting over and losing all the data that had been collected before that set was interrupted. In step 908, a determination is made to use existing counts and sum matrices (e.g., FIG. 6 and FIG. 7) of a previously interrupted set of collection sessions. If the determination is to not use these matrices, then the counts matrix and sum matrix are both zeroed out in step 910. If, however, a determination is made to continue with a set of collection sessions, then the existing counts and sum matrices are used in subsequent steps of the data collection.

Step 912 starts a new collection session by initializing, or zeroing out, an old real-time average pressure profile. At the end of this new collection session a new real-time average pressure profile will be calculated. The real-time average pressure profile will have a value for each of the axial segments of the sensing roll 10 as more fully described below.

In step 914, raw pressure readings, or sensor signals, are collected by the sensors 26 of the sensing roll 10. In addition to the raw pressure readings themselves, corresponding time segments (or circumferential segments) of the mating roll 11 and axial segment numbers (e.g., 1-14) are collected for each raw pressure reading. For example, a particular sensor 26 will enter a region of the nip 12 and acquire a raw pressure reading. Based on the trigger signal 901 described above, a determination can also be made as to which of the 50 circumferential segments, or 50 time segments, of the mating roll 11 is also in the nip 12. Thus, based on the determined circumferential segment and the sensor 26, which corresponds to a particular axial segment, one of the 7000 cells in each of the matrices of FIG. 6 and FIG. 7 can be identified. Once those cells are identified, the counts matrix and the sum matrix can be updated, in step 916.

Also, one of the 7000 cells of the stored average pressure matrix (e.g., FIG. 8A) can be identified based on the circumferential segment and sensor corresponding to the raw pressure reading sensed in step 914. The average pressure value of that one corresponding matrix cell can be selected, in step 917, and corrected using its corresponding column average value (e.g., from row 302 of FIG. 8A). As discussed above, correcting a cell value from the average pressure matrix can entail subtracting the appropriate column average value from that cell value to determine a corrected cell value (i.e., a corrected average pressure value). This corrected average pressure value can then be used, in step 918, to adjust the raw pressure reading. In particular, the corrected average pressure value from the average pressure matrix can be subtracted from the raw pressure reading.

In those instances when a stored average pressure matrix is not available or a zeroed-out average pressure matrix is used, then the raw pressure reading remains unchanged by steps 917 and 918. Also, in those instances where a separate "correction" matrix is created separate from the average pressure matrix, steps 917 and 918 can be combined so that an appropriate cell value is selected directly from the "correction" matrix and used to adjust a raw pressure reading.

The value from step 918 is associated with a particular axial segment of the sensing roll 10 (as identified in step 914) and a corresponding axial segment of the real-time average pressure profile. Thus, the value from step 918 is stored, in step 920, in order that the real-time average pressure profile can be calculated. Each time a raw pressure reading is adjusted using a corrected average pressure matrix cell value an adjusted pressure reading value, or an adjusted raw pressure reading value, is calculated. That adjusted pressure reading value is summed with all the other adjusted pressure reading values for a particular axial segment acquired earlier during the current collection session and a count of the total number of adjusted pressure reading values used in constructing that sum is stored as well. From this stored data and at the end of the collection session, see step 924, an average pressure value can be constructed for each axial segment of the real-time average pressure profile by dividing the summation of the adjusted pressure reading values by the count of the total number of adjusted pressure reading values.

A determination of whether the collection session is complete is determined in step 922. The determination in step 922 can be based on the collection session lasting for a predetermined time period (e.g., 5 minutes) or based on the collection session lasting for a predetermined number of rotations of the sensing roll 10 (e.g., 100 rotations).

If, in step 922, it is determined that the collection session is complete, then the real-time average pressure profile is calculated and output in step 924. If the collection session is not complete, however, then control returns to step 914 and more raw pressure readings are acquired and adjusted to continue building the data to be used to calculate the real-time average pressure profile.

The average pressure matrix (e.g., FIG. 8A) can be built using data collected across multiple collection sessions (i.e., a set of collection sessions). As noted above, a set of collection sessions may be defined as occurring every 24 hours. Thus, in step 926, a determination is made as to whether or not a current set of collection sessions is completed, e.g., has a given 24 hour period for a current collection session set ended? If the set of sessions to build a new average pressure matrix is not complete, then a determination can be made in step 928 as to whether or not to even continue the process of acquiring pressure readings related to the nip 12. For example, an operator can choose to interrupt the data collection process for a variety of operational-related reasons. Thus, in step 930, the process of FIG. 9 can be stopped if desired; otherwise, a delay is introduced, in step 932, before the next collection session of the current set is started in step 912. In the illustrated embodiment, each collection session occurs over a predefined time period, e.g., five minutes, and the delay period comprises another predefined time period, e.g., 55 minutes.

If the set of collection sessions is complete, however, then in step 934 the average pressure matrix for the completed set of collection sessions is built, using the counts matrix and sum matrix that were being updated in step 916. This new average pressure matrix is then, in step 936, stored so that its values can be used in step 918 when adjusting the raw pressure readings acquired during subsequent collection sessions of a new set for calculating different real-time average pressure profiles. Once a new average pressure matrix is built, a corresponding correction matrix could be built and stored as well. If such a correction matrix is built and stored, then its values can be used in step 918 when adjusting raw pressure readings acquired during subsequent collection sessions of a new set. In step 938, a delay occurs before beginning the building of a new average pressure matrix by starting a new set of collection sessions. For example, the delay may typically equal the delay used in step 932 (e.g., 55 minutes). After the delay of step 938, the count and sum matrices are zeroed-out in step 910 and a first collection session, of a new set of collection sessions, starts with step 912.

In the above description, in steps 917 and 918, a raw pressure reading is adjusted using a corrected value from a corresponding cell of the matrix of FIG. 8A having average pressure values for each of the 7000 possible permutations. Alternatively, data smoothing could be accomplished by averaging adjacent corrected cells of the matrix of FIG. 8A before adjusting the raw pressure reading. For the purpose of simplifying a description of possible data smoothing approaches, reference is made below to a separate correction matrix, such as the one in FIG. 8B that has cell values that already have been corrected using appropriate column averages of the average pressure matrix of FIG. 8A. For example, in a particular column of the correction matrix, a cell will have adjacent rows that represent adjacent circumferential segments. Accordingly, five cells (for example) could be selected from the correction matrix—a particular cell (associated with a current raw pressure reading) and the two cells above it and the two cells below it. The five values from these five cells can, themselves, be averaged together to calculate an adjustment value to subtract from the raw pressure reading in step 918. Smoothing can be used when some cells in the count matrix (FIG. 6) have low values that would tend to cause the average pressure matrix (FIG. 8A) to be noisy. If a cell in the count matrix has zero counts, then the calculated average pressure corresponding to that cell cannot be made and smoothing is necessary.

Similar data smoothing could be accomplished as well in the axial direction. In this case, three cells, for example, could be selected from the correction matrix of FIG. 8B—a particular cell associated with a current raw pressure reading, the cell to its left, and the cell to its right. The three values from these three cells could each be averaged together to calculate an adjustment value to subtract from the raw pressure reading in step 918.

FIG. 10 illustrates the overall architecture of one particular system for monitoring paper production product quality. The system of FIG. 10 includes the processor 903, noted above, which defines a measurement and control system that evaluates and analyzes operation of the roll 11. The processor 903 comprises any device which receives input data, processes that data through computer instructions, and generates output data. Such a processor can be a hand-held device, laptop or notebook computer, desktop computer, microcomputer, digital signal processor (DSP), mainframe, server, other programmable computer devices, or any combination thereof. The processor 903 may also be implemented using programmable logic devices such as field programmable gate arrays (FPGAs) or, alternatively, realized as application specific integrated circuits (ASICs) or similar devices. The processor 903 may calculate and display the real-time average pressure profile calculated at the end of the prior collection session. For example, the pressure measurements from the sensors 26 can be sent to a wireless receiver 905 from transmitter(s) 40 located on the sensing roll 10. The signals can then be communicated to the processor 903. It is contemplated that the processor 903, in addition to calculating a real-time average pressure profile, may use the real-time average pressure profile to automatically adjust crown and loading mechanisms to achieve a flat pressure profile. Crown and loading mechanisms may also be adjusted manually by an operator using information provided by the real-time average pressure profile.

As noted above, one benefit of embedding a single set of sensors in covered rolls is to measure the real-time pressure profile and adjust loading pressures and roll crowns or roll curvature (using, for example, internal hydraulic cylinders) to achieve a flat pressure profile. As an alternative to a single set 24 of sensors 26 as shown in FIG. 2, FIG. 11 depicts two pluralities or arrays 24A, 28 of sensors 126A, 30 on a sensing roll 102. In the illustrated embodiment, the sensing roll 102 is separated into 14 axial segments. First and second pluralities 24A and 28 of sensors 126A and 30, respectfully, are disposed at least partially in the roll cover 22. Each of the first plurality 24A of sensors 126A is located in one of the 14 axial segments of the sensing roll 102. Likewise, each of the second plurality 28 of sensors 30 is located in one of the 14 axial segments of the sensing roll 102. Each sensor 126A of the first plurality 24A has a corresponding sensor 30 from the second plurality 28 located in a same axial segment of the sensing roll 102. The first plurality 24A of sensors 126A are disposed along a line that spirals around the entire length of the roll 102 in a single revolution to define a helical pattern. In a similar manner, the second plurality 28 of sensors 30 are disposed along a line that spirals around the entire length of the roll 102 in a single revolution to define a helical pattern. The first and second pluralities 24A and 28 of sensors 126A and 30 are separated from one another by 180 degrees. Each sensor 126A and 30 measures the pressure that is being exerted on the sensor when it enters the region of the nip 12 between the rolls 102 and 11. It is contemplated that the first and second pluralities 24A and 28 of sensors 126A and 30 may be linearly arranged so as to define first and second lines of sensors, which are spaced approximately 180 degrees apart. Various alternative configurations of a plurality of sensors are also contemplated. For example, a plurality of sensors could be helically arranged in a line that spirals, in two revolutions, around the entire length of roll 102.

Assuming the above example of 14 axial segments and 50 circumferential segments, each plurality 24A, 28 of sensors 126A, 30 may have their own corresponding 7000 cell matrices of stored values. Thus, the plurality 24A of sensors 126A may have matrices for a number of times a particular sensor 126A and a mating roll circumferential segment were in the region of the nip 12 (e.g., a counts matrix), summations of pressure readings (e.g., a sum matrix), average pressure values (e.g., an average pressure matrix) and corrected average pressure values (a correction matrix). The plurality 28 of sensors 30 likewise may have its own matrices for a number of times a particular sensor 30 and a mating roll circumferential segment were in the region of the nip 12 (e.g., a counts matrix), summations of pressure readings (e.g., a sum matrix), average pressure values (e.g., an average pressure matrix) and corrected average pressure values (e.g., a correction matrix). In each of the respective cells a value is stored that is associated with a particular sensor 126A, 30, and a particular axial segment and circumferential segment of the mating roll. Accordingly, matrices similar to FIGS. 6, 7, 8A and 8B would be stored for each of the different sensor pluralities, or sensor arrays, 24A, 28. However, because the data was collected by sensors separated by 180°, the differences between values in the two sets of matrices may reveal information about rotational variability of the sensing roll 10.

Thus, for the first plurality 24A of sensors, there are 14 axially arranged sensors 126A, each of which can be uniquely referred to using an axial segment index value that ranges from "1" to "14", and there are 50 tracking segments associated with the mating roll 11, each of which can be uniquely referred to using a tracking segment index value ranging from "1" to "50", which together create 7000 (i.e., 50×14=7000) unique permutations of pairs consisting of a sensor number and a circumferential segment number (or time segment number), wherein each permutation is identifiable by a first two-element set comprising a respective axial segment index value and a respective tracking segment index value. Thus, a raw pressure reading from a sensor 126A can be associated with an axial segment index value and a tracking segment index value which, together, uniquely identify 1 of 7000 cells in each of the matrices shown in FIGS. 6, 7, 8A and 8B that are associated with the first plurality 24A of sensors. Based on the particular permutation of an axial segment index value and tracking segment index value, data can be added to, or extracted from, an appropriate cell of one those matrices associated with the first plurality 24A of sensors.

In addition to those 7000 permutations, for the second plurality 28 of sensors 30, there are also 14 axially arranged sensors 30, each of which can be uniquely referred to using an axial segment index value that ranges from "1" to "14", and there are still the 50 tracking segments associated with the mating roll 11, each of which can be uniquely referred to using the tracking segment index values, which create 7000 (i.e., 50×14=7000) unique permutations of pairs consisting of a sensor number and a circumferential segment number (or time segment number), wherein each permutation is identifiable by a second two-element set comprising a respective axial segment index value and a respective tracking segment index value. Thus, a raw pressure reading from a sensor 30 can be associated with an axial segment index value and a tracking segment index value which, together, uniquely identify 1 of 7000 cells in each of the matrices shown in FIGS. 6, 7, 8A and 8B that are associated with the second plurality 28 of sensors. Based on the particular permutation of an axial segment index value and tracking segment index value, data can be added to, or extracted from, an appropriate cell of one those matrices associated with the second plurality 28A of sensors.

Similar, in concept, to having two sensor pluralities 24A, 28 on the sensing roll 102 is having one sensor array 24 on the sensing roll 10 (referred to as a first sensing roll in this embodiment) as shown in FIG. 2 but also having a mating roll 11A (See FIG. 12) with an array 25 of sensors 27 so as to define a second sensing roll, wherein the mating roll 11A replaces the mating roll 11 in FIG. 2. Thus, in addition to the sensors 26, there would also be the array 25 of sensors 27 that enter the region of the nip 12 during each rotation of the second sensing roll 11A. As in the case of two sensor arrays 24A, 28, a respective counts matrix, sum matrix, average pressure matrix and correction matrix could be built for the first sensing roll 10 and the second sensing roll 11A. One difference from the above description, however, is that a separate signal generator 900A and a separate trigger signal 901A (shown in phantom in FIG. 10) may also be associated with the first sensing roll 10 so that its period can be broken into different time segments (or circumferential segments) that are associated with pressure readings when one of the sensors 27 from mating or second sensing roll 11A enters the region of the nip 12.

Thus, for sensor array 24 on the first sensing roll 10, there are 14 axially arranged sensors 26, each of which can be uniquely referred to using a first axial segment index value that ranges from "1" to "14", and there are 50 tracking segments associated with the mating or second sensing roll 11A, each of which can be uniquely referred to using a first tracking segment index value ranging from "1" to "50", which together create 7000 (i.e., 50×14=7000) unique permutations of pairs consisting of a sensor number and a circumferential segment number (or time segment number), wherein each permutation is identifiable by a first two-element set comprising a respective first axial segment index value and a respective first tracking segment index value. Thus, a raw pressure reading from a sensor 26 can be associated with a first axial segment index value and a first tracking segment index value which, together, uniquely identify 1 of 7000 cells in each of the matrices shown in FIGS. 6, 7, 8A and 8B that are associated with the sensor array 24. Based on the particular permutation of the first axial segment index value and first tracking segment index value, data can be added to, or extracted from, an appropriate cell of one those matrices associated with the sensor array 24.

In addition to those 7000 permutations, for sensor array 25 there are also 14 axially arranged sensors 27, each of which can be uniquely referred to using a second axial segment index value that ranges from "1" to "14", and there are 50 tracking segments associated with the sensing roll 10, each of which can be uniquely referred to using a second tracking segment index value ranging from "1" to "50", which create 7000 (i.e., 50×14=7000) unique permutations of pairs consisting of a sensor number and a circumferential segment number (or time segment number), wherein each permutation is identifiable by a second two-element set comprising a respective second axial segment index value and a respective second tracking segment index value. Thus, a raw pressure reading from a sensor 27 can be associated with a second axial segment index value and a second tracking segment index value which, together, uniquely identify 1 of 7000 cells in each of the matrices shown in FIGS. 6, 7, 8A and 8B that are associated with the sensor array 25. Based on the particular permutation of the second axial segment index value and second tracking segment index value, data can be added to, or extracted from, an appropriate cell of one those matrices associated with the sensor array 25.

The process of FIG. 9 is substantially the same even when there are multiple arrays or pluralities of sensors and multiple sets of matrices such as, for example, if there are two sensing rolls 10, 11A or there are two arrays, or sets, (24A, 28) of sensors on a single sensor roll 102. Similar to step 914, the raw pressure reading from a sensor entering the nip 12 is still being acquired. However, the appropriate counts and sum matrices that will be updated also take into account which plurality (e.g., 24A, 28) or array (e.g., 24, 25) the sensor is a part of. Similarly, when adjusting the raw pressure reading, an average pressure value is selected from the appropriate average pressure matrix that corresponds to that sensor plurality 24A, 28 or array 24 25, see step 917. As for the real-time average pressure profile data that is stored, the adjusted pressure readings can be averaged into its appropriate axial segment value of the profile regardless of the sensor plurality 24A, 28 or array 24 25 used in acquiring that reading. Also, in an embodiment having multiple sensor pluralities or arrays, steps 934 and 936 are completed for each sensor plurality or array; in other words, a respective average pressure matrix is built and stored for each plurality (e.g., 24A, 28) or array (e.g., 24 25) of sensors.

FIG. 13 is a flowchart of one example modification to show a data collection session according to FIG. 9 may change when multiple sensor pluralities or arrays are used in collecting nip pressure data in accordance with the principles of the present invention. As described with relation to FIG. 9, a new collection session begins in step 912 with zeroing out an old real-time average pressure profile.

In step 914A, a raw pressure reading is collected when a sensor from any of the pluralities (24A, 28) or arrays (e.g., 24, 25) enters a region of the nip 12. Accordingly, a determination is made of which sensor plurality or array that sensor belongs to, a time (or circumferential) segment (i.e., a tracking segment) associated with the raw pressure reading, and an axial position associated with the raw pressure reading. Which sensor plurality or array a particular sensor belongs to can be referred to as the "membership" of that sensor; or, in other words, which array or plurality that sensor is a "member" of.

When the sensing roll 102 includes two (or more) pluralities or arrays of sensors, then the time (or circumferential) segment number of the mating roll 11 is determined based on the time that has elapsed since the last trigger signal from the mating roll 11 (as described above). However, when the mating roll 11A is itself a sensing roll, then the time (or circumferential) segment number associated with any raw pressure readings collected by sensors 27 of the mating or second sensing roll 11A are determined based on the time that has elapsed since the last trigger signal from the first sensing roll 10. Thus, when there are two sensing rolls 10, 11A, their respective roles vacillate between being a "sensing" roll and a "mating" roll. When a raw pressure reading is acquired by a sensor 27 of the second sensing roll 11A, then that roll 11A is acting as a sensing roll and the first sensing roll 10 is actually considered as a "mating" roll whose surface is being mapped. Similarly, when a raw pressure reading is acquired by a sensor 26 of the first sensing roll 10, then that roll 11 is acting as the sensing roll and the other sensing roll 11A is actually considered as a "mating" roll whose surface is being mapped. So, even if a roll is explicitly labelled a sensing roll in the above description, such as rolls 10 and 11A, that particular roll can sometimes be acting as a "sensing" roll and at other times be acting as a "mating" roll.

In step 916A, for each raw pressure reading generated by a sensor 126A, 30 26, 27, the counts matrix and sum matrix associated with the sensor plurality (24A, 28) or array (24, 25) of which that sensor is a member is determined and an appropriate cell in each of those matrices is determined based on the time (or circumferential) segment number and the axial position associated with the sensor that generated the raw pressure reading. These cells in the appropriate counts and sum matrices can then be updated.

In step 917A, the stored average pressure matrix corresponding to the sensor plurality or array of the sensor (i.e., the membership of the sensor) that collected the raw pressure reading is determined and an appropriate cell is selected based on the time (or circumferential) segment number and the axial position determined in step 914A. As described above, an average pressure matrix can include a row of column averages which can be used to correct each cell value of the average pressure matrix when it is selected in this step.

In step 918A, this corrected average pressure value can be subtracted from the raw pressure reading to calculate an adjusted pressure reading value. Based on the axial position of the raw pressure reading, the adjusted pressure reading value can be stored, in step 920A, with the other adjusted pressure reading values for that axial position collected during the current collection session in order to calculate a real-time average pressure profile at the appropriate time. Hence, when multiple sensor pluralities or arrays are used, adjusted pressure reading values from the multiple sensor pluralities or arrays at each axial position are summed together to determine an average pressure value for each axial position when determining the real-time average pressure profile.

For the embodiment comprising first and second pluralities 24A and 28 of sensors 126A and 30 on a sensing roll 102, each time a raw pressure reading from one of a pair of sensors 126A and 30, positioned at a same axial segment of the sensing roll 30 and circumferentially spaced apart, is adjusted using a corrected average pressure matrix cell value, that adjusted pressure reading value is summed with all the other adjusted pressure reading values for that particular axial segment acquired earlier by that sensor pair (126A, 30) and during the current collection session and a count of the total number of adjusted pressure reading values from that sensor pair used in constructing that sum is stored as well. From this stored data and at the end of the collection session, an average pressure value can be constructed for each axial segment of a real-time average pressure profile for the nip region of the sensing roll 102 and mating roll 11 by dividing the summation of the adjusted raw pressure reading values by the count of the total number of adjusted pressure reading values.

For the embodiment comprising a first array 24 of sensors 26 on the first sensing roll 10 and a second array 25 of sensors 27 on the mating or second sensing roll 11A, each time a raw pressure reading from one of the sensors 26 on the first sensing roll 10 is adjusted using a corrected average pressure matrix cell value, that adjusted raw pressure reading value is summed with all the other adjusted raw pressure reading values for that particular axial segment on the first sensing roll 10 acquired earlier by that sensor 26 as well as with all the other adjusted raw pressure reading values for a corresponding or same axial segment on the mating roll 11A acquired earlier by a sensor 27 on the mating roll 11A at the corresponding axial segment on the mating roll 11A during the current collection session and a count of the total number of adjusted raw pressure reading values from that sensor 26 and its corresponding sensor 27 at the same axial segment on the mating roll 11A used in constructing that sum is stored as well. Likewise, each time a raw pressure reading from one of the sensors 27 on the second sensing roll 11A is adjusted using a corrected average pressure matrix cell value, that adjusted raw pressure reading value is summed with all the other adjusted raw pressure reading values for that particular axial segment on the second sensing roll 11A acquired earlier by that sensor 27 as well as with all the other adjusted raw pressure reading values for a corresponding or same axial segment on the first sensing roll 10 acquired earlier by a sensor 26 on the first sensing roll 10 at the corresponding axial segment on the sensing roll 10 during the current collection session. From this stored data and at the end of the collection session, an average pressure value can be constructed for each axial segment of a real-time average pressure profile for the nip region of the first and second sensing rolls 10 and 11A by dividing the summation of the adjusted raw pressure reading values by the count of the total number of adjusted pressure reading values. As an alternative, a separate real-time pressure profile can be calculated for each of the sensor arrays 24, 25. Calculating separate real-time pressure profiles may allow calibration of the sensors which comprise the arrays 24, 25. Sensor calibration can be checked and adjusted by comparing, for each axial segment of the pressure profile, the pressures of two sensors, one from each array 24, 25, that are in the nip at the same time. The sensor values can be adjusted, or calibrated, so that each sensor provides the same reading. Once the arrays 24, 25 of sensors are calibrated, then the separate real-time pressure profiles can be combined into a single real-time pressure profile.

The process can then continue with step 922 (see FIG. 9) to determine if a collection session is completed or not. When all collection sessions for a set of collection sessions are completed, then a new average pressure matrix can be built using the counts and sums matrices. In an embodiment with multiple sensor pluralities or arrays, a respective new average pressure matrix is built corresponding to each sensor pluralities or array and can be used in subsequent collection sessions (e.g., the next day). That is, a separate new average pressure matrix is built for each sensor plurality or sensor array.

The above description of the flowchart of FIG. 13 assumed that the sensing roll 10 and the sensing roll 11A each had been logically divided into the same number of axial segments (e.g., 14) defined by the number of sensors on the opposite sensing roll. The above description also assumed that both sensing rolls 10, 11A had also been segmented into the same number (e.g., 50) of tracking segments. Accordingly, the matrices associated with each of the sensing rolls were all of the same size (e.g., 7,000 cells). One of ordinary skill will recognize that each of the sensing rolls could have respective numbers of axial segments and tracking segments that are different from one another. The steps of the flowcharts of FIG. 9 and FIG. 13 would remain substantially the same but the corresponding matrices associated with each sensing roll would be different sizes.

In the case where the two rolls have the same number of axial segments (e.g., 14) but different numbers of tracking segments, the sensing roll that has more tracking segments will contribute, for each axial segment, more data samples to the real-time pressure profile calculated in 924; but the steps of the flowchart remain the same.

In the case where the two sensing rolls have different numbers of axial segments, then the collection of data and the building of various matrices for each sensing roll remains the same but the method of calculating the real-time pressure profile using that data may be modified. For example, if all the sensors on both rolls were evenly-spaced and the sensing roll 10 had twice as many sensors as the sensing roll 11A, then one axial section of the nip will be associated with two sensor readings from the sensor roll 10 and only one sensor reading from the sensor roll 11A. Various techniques can be used to combine these three values in a manner that provides a beneficial real-time pressure profile value for that axial section of the nip. As a general principle, each separate axial section of the nip will be associated with one or more sensors on one sensing roll and one or more sensors on the other sensing roll. Creation of the real-time average pressure nip profile is performed by determining which sensors are associated with which axial segment of the nip and combining the values from those sensors in a statistically appropriate manner.

As mentioned above, there are ways for synchronizing sensor measurements other than using the signal generator 900 (or 900A) to generate respective trigger signals 900. In general, a trigger signal is associated with the mating roll 11 being in a known reference position such that the time that has elapsed since the most-recent trigger signal allows the processor 903 to identify a present rotational position of the mating roll relative to that reference position. Alternative techniques that allow the processor 903 to calculate a rotational position of the mating roll 11 relative to a reference position can also be utilized. For example, a pulse generator could generate 1000 pulses per each rotation of the mating roll 11 and a counter could count the pulses such that after the count reaches 1000 the counter is reset to start-over counting from "1". By considering the position of the mating roll 11 to be at the "reference position" when the counter starts over, a current pulse count value when a sensor signal is acquired can be provided to the process 903 and used to determine a rotational position of the mating roll 11 relative to the reference position.

When more than one sensing roll is used, there are other alternatives to the signal generators 900 and 900A providing respective trigger signals 901, 901A to the processor 903 in order to determine time segments or circumferential segments. In particular, the timing of sensor data from each of the sensing rolls 10, 11A could also be used for a similar purpose. For example, acquiring raw pressure readings from the sensors 27 of the sensing roll 11A can be synchronized with respect to the rotation of the sensing roll 10. One of the fourteen sensors 26 of the sensing roll 10 can be selected to indicate a full rotation of the sensing roll 10 such that each time that one sensor 26 enters the region of the nip 12 the sensing roll 10 is considered to have made a rotation and a periodically occurring first time reference is established. Rather than measuring time since an externally applied trigger signal, time since the most recently occurring first time reference can be used. Each time that one sensor 26 enters the region of the nip 12, measurement of a time period can be re-started such that the elapsed time in the current time period is indicative of which of the tracking segments associated with the sensing roll 10 is presently in the region of the nip 12. Thus, when a sensor 27 from the sensing roll 11A enters the region of the nip 12 and acquires a raw pressure reading, the elapsed time period since that one sensor 26 of the sensing roll 10 last entered the nip 12 can be used to identify an appropriate time segment or circumferential segment of the sensing roll 10 to associate with that raw pressure reading. In accordance with this alternative, the pressure measurements communicated by the wireless transmitters 40, 40A to the processor 903 can also include timing information to allow the processor 903 to perform the appropriate time-based calculations.

A similar approach can also be used to also measure the raw pressure readings acquired from sensors 26 synchronously with respect to rotation of the sensing roll 11A. In this approach, one of the fourteen sensors 27 of the sensing roll 11A can be selected to indicate a full rotation of the sensing roll 11A such that each time that one sensor 27 enters the region of the nip 12 the sensing roll 11A is considered to have made a rotation and a periodically occurring second time reference is established. Rather than measuring time since an externally applied trigger signal, time since the most recently occurring second time reference can be used to synchronize sensor measurements by sensors 26 with respect to the rotational period of the sensing roll 11A.

Also, three or more sensor arrays may be arranged on a single sensing roll or two or more sensor arrays can be arranged on a pair of sensing rolls that form a nip. Thus, one of ordinary skill will appreciate that acquiring data from two sensor arrays, as discussed herein, is provided merely by way of example and that data from more than two arrays of sensors may also be acquired without departing from the scope of the present invention. Each sensor array will have its own associated matrices as shown in FIGS. 6-8A; however, the steps of the flowcharts of FIG. 9 and FIG. 13 will remain substantially the same for each sensor array regardless of the number, and configuration, of the multiple sensor arrays.

The various example arrangements of rolls described above included arrangements of two rolls; however, it is possible to arrange three or more rolls in such a way as to move webs of material. For example, one sensing roll could be located between two mating rolls such that the sensing roll forms two separate nips, one with each mating roll. In such an arrangement, a sensor of the sensing roll will rotate through two nips during each rotation of the sensing roll and respective pressure readings can be acquired from each nip. Thus, the matrices of FIGS. 6-8B and a real-time average pressure profile can be calculated for each nip in accordance with the principles described above. Even though only one sensing roll is actually present, the collection and analysis of data is functionally equivalent to two sensing rolls and two mating rolls forming separate nips such that the method described in the flowchart of FIG. 9 would be implemented separately for each mating roll.

Similarly, three sensing rolls could also be arranged such that a central sensing roll forms separate nips with two outside sensing rolls. The matrices of FIGS. 6-8B and a real-time average pressure profile can be calculated for each nip in accordance with the principles described above. Even though only three sensing rolls are actually present, the collection and analysis of data is functionally equivalent to two different pairs of sensing rolls forming separate nips such that the method described in the flowcharts of FIG. 9 and FIG. 13 would be implemented separately for each hypothetical pair of sensing rolls.

One of ordinary skill will readily recognize that there a many different ways to arrange a plurality of sensors or sensor arrays on a sensing roll. One example of such an arrangement is provided in U.S. Pat. No. 8,475,347 where arrays of sensors are "interleaved". In other words, each sensor of a first array of sensors is associated with a respective axial segment of a sensing roll while each sensor of a second array of sensors is associated with a respective axial segment of the sensing roll. In particular, however, each the respective axial locations associated with a sensor of the first array of sensors is located in-between a pair of respective axial segments associated with a pair of sensors of the second array, to create an "interleaving" of the sensors of the two different sensor arrays. In accordance with the principles of the present invention, the example methods described with respect to FIG. 9 and FIG. 13 can be utilized with such an arrangement of interleaved sensors. If for example, a first sensor array had x sensors and an interleaved second sensor array had y sensors, then various real-time nip pressure profiles could be constructed in accordance with the principles of the present invention. Two separate nip profiles, for example, could be generated with one nip profile having x axial segments corresponding to sensor readings from the first sensor array and a second nip profile having y axial segments corresponding to they sensors of the second sensor array. A composite nip profile that has (x+y) axial segments could then be constructed by combining the two separate nip profiles and graphically presented to an operator.

Alternatively, the two arrays of sensors could be treated, in accordance with the principles of the present invention, as a single array having (x+y) sensors and, therefore, (x+y) corresponding axial segments. Accordingly, a single nip profile could then be constructed, and graphically presented to an operator, that has (x+y) axial segments.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A system comprising a sensing roll and a mating roll, the system further comprising:
   a first array of sensors located at axially spaced-apart locations of the sensing roll, wherein each sensor of the first array enters a region of a nip between the sensing roll and the mating roll during each rotation of the sensing roll to generate a first respective sensor signal;
   a second array of sensors located at axially spaced-apart locations of the mating roll, wherein each sensor of the second array enters a region of the nip between the sensing roll and the mating roll during each rotation of the mating roll to generate a second respective sensor signal,
   a periodically occurring first time reference associated with each rotation of the mating roll;
   a periodically occurring second time reference associated with each rotation of the sensing roll and
   a processor to receive a received sensor signal, the received sensor signal comprising one of the first respective sensor signal and the second respective sensor signal, and, upon receiving the received sensor signal, the processor operates to:
     determine a particular one of the sensors of the first array or second array which generated the received sensor signal,
     when the particular one sensor is from the first array, then based upon a first amount of time that has elapsed since a most recent first time reference, determine a detected tracking segment based on which one of a plurality of first tracking segments associated with the mating roll enters the region of the nip substantially concurrently with the particular one sensor from the first array,
     when the particular one sensor is from the second array, then based upon a second amount of time that has elapsed since a most recent second time reference, determine a detected tracking segment based on which one of a plurality of second tracking segments associated with the sensing roll enters the region of the nip substantially concurrently with the particular one sensor from the second array; and
     store the received sensor signal to associate the received sensor signal with the detected tracking segment.

2. The system of claim 1, wherein the processor receives:
   the first respective sensor signal for each of the sensors of the first array during each rotation of the sensing roll,
   the second respective sensor signal for each of the sensors of the second array during each rotation of the mating roll; and
   a plurality of sensor signals comprising:
     a plurality of first respective sensor signals occurring during a plurality of rotations of the sensing roll, and a plurality of second respective sensor signals occurring during a plurality of rotations of the mating roll.

3. The system of claim 2, wherein, for each one of the plurality of sensor signals, the processor identifies:
its detected tracking segment,
an associated axial segment, and
whether said particular one of the plurality of sensor signals is generated from the first array of sensors or from the second array of sensors.

4. The system of claim 3, wherein:
the mating roll and the sensing roll each, respectively, comprises n axial segments, having respective index values: 1, 2, . . . , n;
the mating roll and the sensing roll each, respectively has associated therewith, m tracking segments, having respective index values: 1, 2, . . . , m, and
wherein, for the first array of sensors, there are (n times m) unique permutations, respectively, that are identifiable by a two-element first set comprising a respective first axial segment index value and a respective first tracking segment index value and for the second array of sensors, there are (n times m) unique permutations, respectively, that are identifiable by a two-element second set comprising a respective second axial segment index value and a respective second tracking segment index value.

5. The system of claim 4, wherein:
a respective average pressure value is associated with each of the (n times m) unique permutations of each of the first and second sets, each of the respective average pressure values based on previously collected pressure readings related to the nip.

6. The system of claim 5, wherein:
a first respective column average value is associated with each first axial segment index value, each first respective column average value comprising an average of the m respective average pressure values, from the first set, associated with that first axial segment index value, and
a second respective column average value is associated with each second axial segment index value, each second respective column average value comprising an average of the m respective average pressure values, from the second set, associated with that second axial segment index value.

7. The system of claim 6, wherein the processor operates to:
for each one of the received sensor signals which defines a pressure reading:
determine a particular first or second axial segment index value and a particular first or second tracking segment index value based on that signal's associated axial segment, its detected tracking segment, and whether that signal is generated from the first array of sensors or the second array of sensors;
select the respective average pressure value associated with the particular first or second axial segment index value and the particular first or second tracking segment index value;
calculate a respective corrected average pressure value by subtracting:
one of the first respective column average value or second respective column average value associated with the particular first or second axial segment index value from the
selected respective average pressure value; and
calculate a respective adjusted pressure reading value by subtracting the respective corrected average pressure value from the one received sensor signal.

8. The system of claim 7, wherein the processor operates to:
calculate an average pressure profile based on the respective adjusted pressure reading values.

9. The system of claim 8, wherein the processor adjusts operating conditions of the rolls using the respective adjusted pressure reading values by adjusting roll loading mechanisms to achieve a desired pressure profile.

10. The system of claim 4, wherein,
for the plurality of first respective sensor signals and for a first plurality of the possible (n times m) permutations, the processor determines an average of all the plurality of respective first sensor signals associated with a mating roll axial segment and first tracking segment matching each of the first plurality of permutations, and
for the plurality of second respective sensor signals and for a second plurality of the possible (n times m) permutations, the processor determines an average of all the plurality of respective second sensor signals associated with a sensing roll axial segment and detected second tracking segment matching each of the second plurality of permutations.

11. The system of claim 4, wherein,
for the plurality of first respective sensor signals and each of a first plurality of the possible (n times m) permutations, the processor determines:
a number of times one or more of the plurality of first respective sensor signals are associated with a mating roll axial segment and first tracking segment matching that permutation; and
a summation of all of the plurality of first respective sensor signals associated with the mating roll axial segment and first tracking segment matching that permutation, and
for the plurality of second respective sensor signals and each of a second plurality of the possible (n times m) permutations, the processor determines:
a number of times one or more of the plurality of second respective sensor signals are associated with a sensing roll axial segment and second tracking segment matching that permutation; and
a summation of all of the plurality of second respective sensor signals associated with the sensing roll axial segment and second tracking segment matching that permutation.

12. The system of claim 1, wherein the processor adjusts operating conditions of the rolls based on the stored received sensor signals from the first and second arrays of sensors.

13. The system of claim 12, wherein the processor adjusts the operating conditions of the rolls by adjusting roll loading mechanisms.

14. The system of claim 1, wherein each of the plurality of first tracking segments are of substantially equal size and each of the plurality of second tracking segments are of substantially equal size.

15. The system of claim 1, wherein the received sensor signal comprises a pressure value.

16. The system of claim 1, wherein:
the plurality of first tracking segments associated with the mating roll comprise one of:
a plurality of circumferential segments on the mating roll, and a plurality of time segments of a period of the mating roll, and the plurality of second tracking segments associated with the sensing roll comprise one of:
- a plurality of circumferential segments on the sensing roll, and
- a plurality of time segments of a period of the sensing roll.

17. The system of claim 1, comprising:
a first signal generator to generate a respective first trigger signal to define the periodically occurring first time reference; and
a second signal generator to generate a respective second trigger signal to define the periodically occurring second time reference.

18. The system of claim 1, comprising:
a third array of sensors located at axially spaced-apart locations of a second mating roll, wherein each sensor of the third array enters a region of a second nip between the sensing roll and the second mating roll during each rotation of the sensing roll to generate a third respective sensor signal,
the processor to receive the third respective sensor signal and, upon receiving the third respective sensor signal, the processor operates to:
- determine a particular one of the sensors of the third array which generated the third respective sensor signal,
- determine a detected tracking segment of the sensing roll based on which one of a plurality of third tracking segments associated with the sensing roll enters the region of the second nip substantially concurrently with the particular one sensor from the third array, and
- store the third respective sensor signal using the detected tracking segment of the sensing roll.

19. A method associated with a sensing roll and a mating roll comprising:
providing the sensing roll and the mating roll;
generating a first respective sensor signal from each sensor of a first sensor array located at axially spaced-apart locations of the sensing roll, wherein each first respective sensor signal is generated when each sensor enters a region of a nip between the sensing roll and the mating roll during each rotation of the sensing roll;
generating a second respective sensor signal from each sensor of a second sensor array located at axially spaced-apart locations of the mating roll, wherein each second respective sensor signal is generated when each sensor enters a region of a nip between the sensing roll and the mating roll during each rotation of the mating roll,
identifying a periodically occurring first time reference associated with each rotation of the mating roll;
identifying a periodically occurring second time reference associated with each rotation of the sensing roll;
receiving a received sensor signal, the received sensor signal comprising one of the first respective sensor signal and the second respective sensor signal and, upon receiving the received sensor signal:
- determining a particular one of the plurality of sensors which generated the received sensor signal,
- when the particular one sensor is from the first sensor array, then based upon a most-recent-identified first time reference, determining a detected tracking segment based on which one of a plurality of first tracking segments associated with the mating roll enters the region of the nip substantially concurrently with the particular one sensor from the first array,
- when the particular one sensor is from the second sensor array, then based upon a most-recent-identified second time reference, determining a detected tracking segment based on which one of a plurality of second tracking segments associated with the sensing roll enters the region of the nip substantially concurrently with the particular one sensor from the second array; and
- storing the received sensor signal to associate the received sensor signal with the detected tracking segment.

20. The method of claim 19, comprising:
receiving the first respective sensor signal for each of the sensors of the first sensor array during each rotation of the sensing roll,
receiving the second respective sensor signal for each of the sensors of the second sensor array during each rotation of the mating roll; and
receiving a plurality of received sensor signals comprising:
- a plurality of first respective sensor signals occurring during a plurality of rotations of the sensing roll, and
- a plurality of second respective sensor signals occurring during a plurality of rotations of the mating roll.

21. The method of claim 20, comprising:
identifying, for each one of the plurality of sensor signals,
- its detected tracking segment,
- an associated axial segment, and
- whether said particular one of the plurality of sensor signals is generated from the first sensor array or second sensor array.

22. The method of claim 21, wherein:
a respective average pressure value is associated with each of the (n times m) unique permutations of each of the first and second sets, each of the respective average pressure values based on previously collected pressure readings related to the nip.

23. The method of claim 22, wherein:
a first respective column average value is associated with each first axial segment index value, each first respective column average value comprising an average of the m respective average pressure values, from the first set, associated with that first axial segment index value, and
a second respective column average value is associated with each second axial segment index value, each second respective column average value comprising an average of the m respective average pressure values, from the second set, associated with that second axial segment index value.

24. The method of claim 23, comprising:
for each one of the received sensor signals which defines a pressure reading:
- determining a particular first or second axial segment index value and a particular first or second tracking segment index value based on that signal's associated axial segment, its detected tracking segment, and whether that signal is generated from the first sensor array or second sensor array;
- selecting the respective average pressure value associated with the particular first or second axial segment index value and the particular first or second tracking segment index value;
- calculating a respective corrected average pressure signal by subtracting:

one of the first respective column average value or second respective column average value associated with the particular first or second axial segment index value from the selected respective average pressure value; and calculating a respective adjusted sensor signal by subtracting the respective corrected average pressure signal from the one received sensor signal.

25. The method of claim 24, comprising:
calculating an average pressure profile based on the respective adjusted sensor signals.

26. The method of claim 21, wherein:
the sensing roll and the mating roll each, respectively, comprises n axial segments, having respective index values: 1, 2, . . . , n;
the mating roll and the sensing roll each, respectively has associated therewith, m tracking segments, having respective index values: 1, 2, . . . , m; and
wherein
for the first sensor array there are (n times m) unique permutations that are identifiable by a two-element first set comprising a respective first axial segment index value and a respective first tracking segment index value, and
for the second sensor array there are (n times m) unique permutations that are identifiable by a two-element second set comprising a respective second axial segment index value and a respective second tracking segment index value.

27. The method of claim 26, comprising:
for the plurality of first respective sensor signals and for a first plurality of the possible (n times m) permutations, calculating an average of all the plurality of respective first sensor signals associated with a mating roll axial segment and first tracking segment matching each of the first plurality of permutations, and
for the plurality of second respective sensor signals and for a second plurality of the possible (n times m) permutations, calculating an average of all the plurality of respective second sensor signals associated with a sensing roll axial segment and detected second tracking segment matching each of the second plurality of permutations.

28. The method of claim 26, comprising:
for the plurality of first respective sensor signals and each of a first plurality of the possible (n times m) permutations, calculating:
a number of times one or more of the plurality of first respective sensor signals are associated with a mating roll axial segment and first tracking segment matching that permutation; and
a summation of all of the plurality of first respective sensor signals associated with the mating roll axial segment and first tracking segment matching that permutation, and
for the plurality of second respective sensor signals and each of a second plurality of the possible (n times m) permutations, calculating:
a number of times one or more of the plurality of second respective sensor signals are associated with a sensing roll axial segment and second tracking segment matching that permutation; and
a summation of all of the plurality of second respective sensor signals associated with the sensing roll axial segment and second tracking segment matching that permutation.

29. The method of claim 19, further comprising adjusting operating conditions of the rolls based on the stored received sensor signals from the first and second arrays of sensors.

30. The method of claim 29, wherein adjusting the operating conditions of the rolls based on the stored received sensor signals comprises adjusting roll loading pressures.

31. The method of claim 19, wherein each of the plurality of first tracking segments are of substantially equal size and each of the plurality of second tracking segments are of substantially equal size.

32. The method of claim 19, wherein the received sensor signal comprises a pressure value.

33. The method of claim 19, wherein
the plurality of first tracking segments associated with the mating roll comprise one of:
a plurality of circumferential segments on the mating roll, and
a plurality of time segments of a period of the mating roll, and
the plurality of second tracking segments associated with the sensing roll comprise one of:
a plurality of circumferential segments on the sensing roll, and
a plurality of time segments of a period of the sensing roll.

34. The method of claim 19, comprising:
generating a respective first trigger signal to define the periodically occurring first time reference; and
generating a respective second trigger signal to define the periodically occurring second time reference.

35. The method of claim 19, wherein:
the first time reference is based on when a first selected sensor of the second array of sensors periodically enters the region of the nip; and
the second time reference is based on when a second selected sensor of the first array of sensors periodically enters the region of the nip.

* * * * *